(12) United States Patent
Ravindran et al.

(10) Patent No.: US 9,191,459 B2
(45) Date of Patent: Nov. 17, 2015

(54) METHOD AND APPARATUS FOR SEAMLESS MOBILITY TECHNIQUES IN CONTENT-CENTRIC NETWORK

(75) Inventors: Ravishankar Ravindran, San Jose, CA (US); Xinwen Zhang, San Jose, CA (US); Guo Qiang Wang, Santa Clara, CA (US); Sau Man Lo, Atlanta, GA (US)

(73) Assignee: Futurewei Technologies, Inc., Plano, TX (US)

( * ) Notice: Subject to any disclaimer, the term of this patent is extended or adjusted under 35 U.S.C. 154(b) by 651 days.

(21) Appl. No.: 13/442,549

(22) Filed: Apr. 9, 2012

(65) Prior Publication Data

US 2013/0016695 A1   Jan. 17, 2013

Related U.S. Application Data

(60) Provisional application No. 61/506,926, filed on Jul. 12, 2011.

(51) Int. Cl.
*H04L 29/08*   (2006.01)

(52) U.S. Cl.
CPC .................................... *H04L 67/327* (2013.01)

(58) Field of Classification Search
None
See application file for complete search history.

(56) References Cited

U.S. PATENT DOCUMENTS

| 8,305,980 | B1 | 11/2012 | Nix |
| 2002/0082015 | A1 | 6/2002 | Wu |
| 2004/0023634 | A1* | 2/2004 | Jeong et al. ................. 455/436 |
| 2004/0176094 | A1* | 9/2004 | Kim et al. .................... 455/436 |
| 2005/0286471 | A1 | 12/2005 | Yang et al. |
| 2006/0221993 | A1* | 10/2006 | Liao et al. ..................... 370/449 |
| 2007/0025294 | A1* | 2/2007 | Kim et al. .................... 370/331 |
| 2007/0060127 | A1* | 3/2007 | Forsberg ...................... 455/436 |
| 2008/0045217 | A1* | 2/2008 | Kojima ........................ 455/436 |
| 2008/0045221 | A1* | 2/2008 | Cho et al. .................... 455/439 |
| 2008/0062911 | A1* | 3/2008 | Choi et al. ................... 370/315 |

(Continued)

FOREIGN PATENT DOCUMENTS

| CN | 1596023 A | 3/2005 |
| CN | 1757183 A | 4/2006 |

(Continued)

OTHER PUBLICATIONS

"Motoblur," Motorola Mobility, Inc. USA, http://www.motorola.com/Consumers/US-EN/Consumer-Product-and-Services/MOTOBLUR, downloaded from the Internet Apr. 4, 2012, 2 pages.

(Continued)

*Primary Examiner* — Chirag Shah
*Assistant Examiner* — Joshua Smith
(74) *Attorney, Agent, or Firm* — Conley Rose, P.C.; Grant Rodolph; Brandt D. Howell

(57) ABSTRACT

A networking system for a content-centric-network (CCN)/named-data networking (NDN) comprising a first point of attachment (PoA) configured to communicate with a mobile node (MN) and maintain a forwarding state for the MN to support seamless mobility for the MN, and a second PoA configured to communicate with the MN and obtain the forwarding state for the MN from the first PoA after a handoff of the MN from the first PoA to the second PoA, wherein the forwarding state is used to exchange a plurality of interests and a plurality of data responses between the MN and the CCN/NDN.

31 Claims, 10 Drawing Sheets

(56) References Cited

U.S. PATENT DOCUMENTS

| | | | |
|---|---|---|---|
| 2008/0132240 A1* | 6/2008 | Baek et al. | 455/442 |
| 2009/0046573 A1* | 2/2009 | Damnjanovic | 370/216 |
| 2009/0111458 A1* | 4/2009 | Fox et al. | 455/422.1 |
| 2009/0232089 A1* | 9/2009 | Lott | 370/331 |
| 2009/0233611 A1* | 9/2009 | Olsson et al. | 455/446 |
| 2009/0288163 A1 | 11/2009 | Jacobson et al. | |
| 2010/0056215 A1 | 3/2010 | Gorokhov et al. | |
| 2010/0062751 A1* | 3/2010 | Russell et al. | 455/417 |
| 2010/0157866 A1 | 6/2010 | Sarikaya et al. | |
| 2010/0208696 A1* | 8/2010 | Lee et al. | 370/331 |
| 2010/0215020 A1* | 8/2010 | Lee et al. | 370/331 |
| 2010/0215024 A1* | 8/2010 | Chiang | 370/338 |
| 2010/0248727 A1 | 9/2010 | Karaoguz et al. | |
| 2010/0323686 A1* | 12/2010 | Noda et al. | 455/423 |
| 2011/0002305 A1* | 1/2011 | Park et al. | 370/331 |
| 2011/0013596 A1* | 1/2011 | Jung et al. | 370/331 |
| 2011/0019640 A1 | 1/2011 | Chang et al. | |
| 2011/0070906 A1* | 3/2011 | Chami et al. | 455/507 |
| 2011/0274082 A1 | 11/2011 | Calhoun et al. | |
| 2011/0280214 A1 | 11/2011 | Lee et al. | |
| 2012/0028643 A1 | 2/2012 | Falchuk et al. | |
| 2012/0136945 A1* | 5/2012 | Lee et al. | 709/206 |
| 2012/0188983 A1* | 7/2012 | Mihaly et al. | 370/331 |
| 2012/0208512 A1 | 8/2012 | Maharajh et al. | |
| 2013/0016695 A1 | 1/2013 | Ravindran et al. | |
| 2013/0170477 A1* | 7/2013 | Wi et al. | 370/336 |
| 2013/0250769 A1 | 9/2013 | Karaoguz et al. | |

FOREIGN PATENT DOCUMENTS

| | | | |
|---|---|---|---|
| EP | 2120402 A1 | 11/2009 | |
| WO | 2010075431 A1 | 7/2010 | |

OTHER PUBLICATIONS

"Motoblur—The Best of Blur Got Better," Motorola Mobility, Inc. USA, http://www.motorola.com/Consumers/US-EN/Consumer-Product-and-Services/MOTOBLUR, downloaded from the Internet Apr. 4, 2012, 2 pages.

"Motoblur," Motoblur—Wikipedia, http://en.wikipedia.org/wiki/Motoblur, downloaded from the Internet Apr. 4, 2012, 2 pages.

Foreign Communication From a Counterpart Application, PCT Application PCT/CN2012/046507, International Search Report dated Feb. 12, 2013, 4 pages.

Foreign Communication From a Counterpart Application, PCT Application PCT/CN2012/046507, Written Opinion dated Feb. 12, 2013, 9 pages.

Siris, et al. "A Selective Neighbor Caching Approach for Supporting Mobility in Publish/Subscribe Networks," XP-002690920, Jun. 14, 2011, pp. 63-67.

Gaddah, et al. "Extending Mobility to Publish/Subscribe Systems Using a Pro-active Caching Approach," Los Press Mobile Information Systems 6, Dec. 1, 2010, pp. 293-324.

Lee, et al. "Proxy-assisted Content Sharing Using Content Centric Networking (CCN) for Resource-limited Mobile Consumer Devices," IEEE Transactions on Consumer Electronics. vol. 57, No. 2, May 1, 2011, pp. 477-483.

Jacobson, et al. "Networking Named Content," CoNEXT '09 Proceedings of the 5th International Conference on Emerging Networking Experiments and Technologies, Palo Alto Research Center, XP-002608160, Oct. 13, 2009, 13 pages.

Ravindran, et al. "Supporting Seamless Mobility in Named Data Networking," IEEE International Conference on Communications, Jun. 10-15, 2012, pp. 5854-5869.

"Part 11: Wireless LAN Medium Access Control (MAC) and Physical Layer (PHY) Specifications," IEEE Standard for Information Technology—Telecommunications and Information Exchange Between Systems—Local and Metropolitan Area Networks—Specific Requirements, IEEE Std 802.11-2007, Jun. 12, 2007, 1232 pages.

Office Action dated Jan. 9, 2014, 15 pages, U.S. Appl. No. 13/530,373, filed Jun. 22, 2012.

Foreign Communication From a Related Counterpart Application, International Application No. PCT/CN2012/078574, International Search Report dated Oct. 25, 2012, 4 pages.

Foreign Communication From a Related Counterpart Application, International Application No. PCT/CN2012/078574, Written Opinion dated Oct. 25, 2012, 8 pages.

Foreign Communication From a Counterpart Application, Chinese Application No. 201280034731.7, Chinese Office Action dated Aug. 25, 2015, 9 pages.

Foreign Communication From a Counterpart Application, Chinese Application No. 201280034731.7, Chinese Search Report dated Aug. 17, 2015, 2 pages.

* cited by examiner

METHOD AND APPARATUS FOR SEAMLESS MOBILITY TECHNIQUES IN CONTENT-CENTRIC NETWORK

CROSS-REFERENCE TO RELATED APPLICATIONS

The present application claims the benefit of U.S. Provisional Patent Application No. 61/506,926 filed Jul. 12, 2011 by Ravishankar Ravindran, et al. and entitled "Method and Apparatus for Seamless Mobility Techniques in Content-Centric Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a content oriented network (CON), a content router is responsible for routing user requests and content to proper recipients. In the CON, also referred to as an Information-Centric Network (ICN), a domain-wide unique name is assigned to each entity that is part of a content delivery framework. The entities may comprise data content, such as video clips or web pages, and/or infrastructure elements, such as routers, switches, or servers. The content router uses name prefixes, which can be full content names or proper prefixes of content names instead of network addresses, to route content packets within the content network. In the CON, content delivery including publishing, requesting, managing (e.g., modification, deletion, etc.) may be based on content name and not content location. One aspect of the CON that may be different from traditional Internet Protocol (IP) networks is the ability of the CON to interconnect multiple geographical points and cache content temporarily or store content on a more persistent basis. This may allow content to be served from the network instead of an original server, and thus may substantially improve user experience. The caching/storing may be used for real time data that is fetched by the user or for persistent data that belongs to the user or to a content provider, e.g., a third party provider.

SUMMARY

In one embodiment, the disclosure includes a networking system for a content-centric-network (CCN)/named-data networking (NDN) comprising a first point of attachment (PoA) configured to communicate with a mobile node (MN) and maintain a forwarding state for the MN to support seamless mobility for the MN, and a second PoA configured to communicate with the MN and obtain the forwarding state for the MN from the first PoA after a handoff of the MN from the first PoA to the second PoA, wherein the forwarding state is used to exchange a plurality of interests and a plurality of data responses between the MN and the CCN/NDN.

In another embodiment, the disclosure includes a networking system for a CCN/NDN comprising a rendezvous point (RP) configured to communicate with a MN via a first PoA and a second PoA and to maintain a forwarding state for the MN to support seamless mobility for the MN at a handoff from the first PoA to the second PoA, wherein the forwarding state is used to exchange a plurality of interests and a plurality of data responses between the MN and the CCN/NDN.

In another embodiment, the disclosure includes a network component of a CCN/NDN comprising a proxy agent (PA) configured to communicate with a mobility agent (MA) at a MN that is anchored to the network component, comprising a proxy control agent configured to manage the MN, keep track of a forwarding state for the MN, and implement a logic to enable seamless mobility for the MN with the CCN/NDN, and a proxy forwarding agent configured to participate in processing of a plurality of interests data responses exchanged between the MNs and the CCN/NDN.

In yet another embodiment, the disclosure includes a method implemented by a network component for a CCN/NDN comprising receiving, using a receiver, a de-registration message from a MN anchored to the network component when the MN starts a handoff from the network component to anchor to a second network component, receiving an indication from the second network component for the CCN/NDN to retrieve any pending interests and data responses in a local cache, and forwarding, using a transmitter, any pending interests and data responses for the MN to the second network component.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
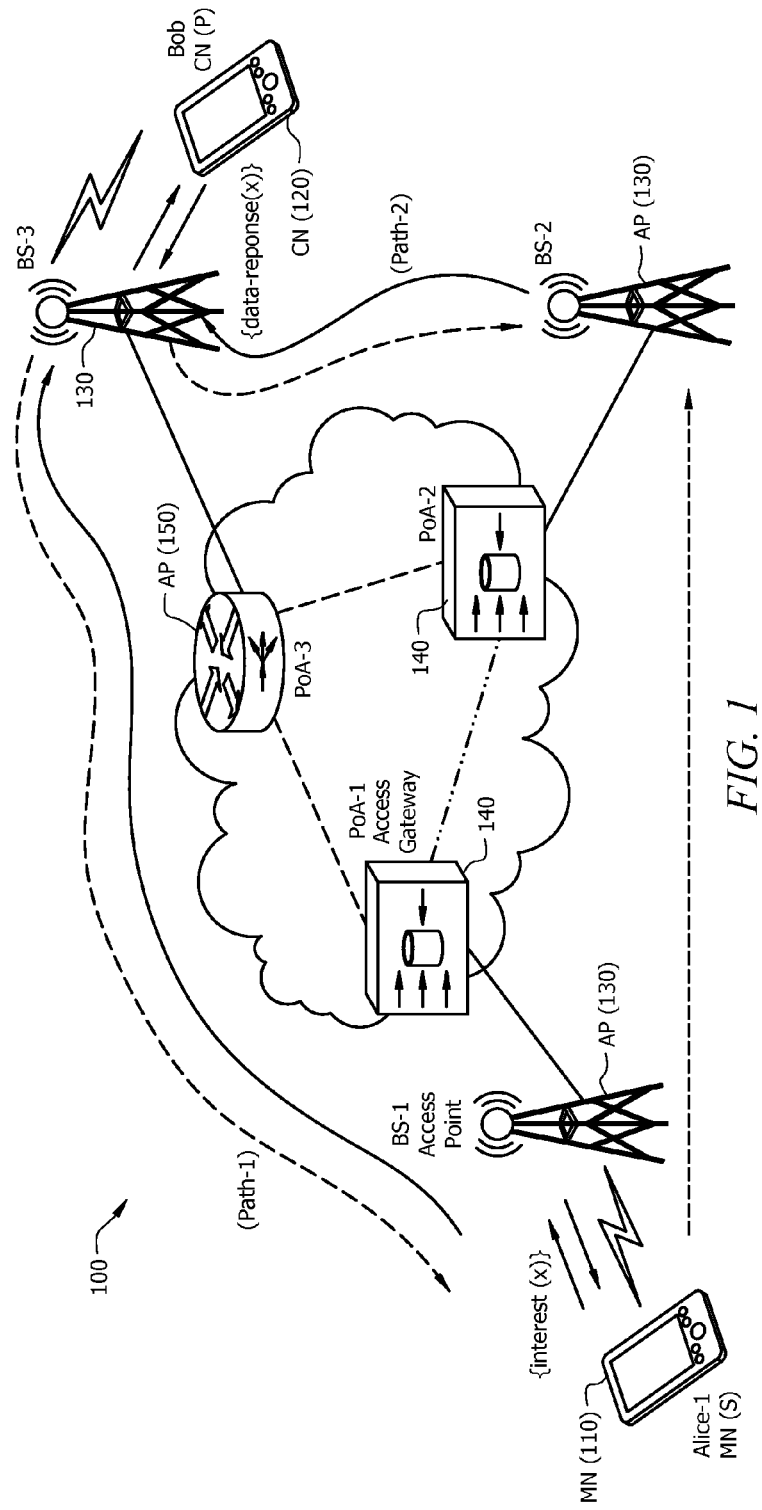
FIG. 1 is a schematic diagram of a CCN/NDN system that supports seamless mobility.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An objective of the ICN architecture is efficient, secure, and reliable dissemination of user requested content over a distributed networking infrastructure, which may meet both the user and the ICN service provider's requirements. Information delivered may include multimedia (voice, video, text), e.g., pertaining to human conversation, streaming, gaming, multipoint-to-multipoint (M2M), and/or other applications. The applications may need support by the network, even when the user device is mobile. Internet Protocol (IP) was not initially built to handle user/device mobility. Mobile IP was developed to solve this issue, but may be inefficient for this purpose due to the inherent limitation of using IP address to indicate both a mobile node's identity and topological location in the network. An improved solution is to implement a naming strategy for resolving the identity of a mobile node which may not change with the mobile node's location, such as proposed in the Locator/Identifier (ID) Separation Protocol (LISP) and other protocols. Future Internet architectures, such as CCN/NDN, Network of Information (NetInf), and Publish Subscribe Internet Routing Paradigm (PSIRP), are based on splitting location and identity of ICN entities.

In the ICN, each entity (e.g., content portion or chunk, mobile entity, or networking element) may be uniquely identified by an identifier. Location-identity split may allow two parties to communicate (enabling session continuity) irrespective of the parties' locations in the network. The mapping of identify to network location may require some form of intelligence by the network. The mapping may be enabled using a centralized mapping entity, such as a location server, or in-network local redirection functionality, where network intelligence may aid in resolving a mobile node's current location. Even though the location-identifier separation feature may be integrated into the ICN, providing seamless mobility may still be challenging since seamless mobility may depend on multiple factors, such as the nature of mobility of the content consuming and producing nodes, and underlying constraints of the ICN infrastructure, such as routing scalability issues. One objective of seamless mobility is to ensure seamless experience to the end user, such as to ensure minimum disruption to user applications as the user moves within the network to meet quality of experience (QoE) for a user.

Disclosed herein are systems and methods for handling seamless mobility for CCN/NDN. The system may include techniques to handle outstanding interests, which may have been expressed between a MN and a corresponding node (CN), when the client is mobile. The techniques may avoid or substantially reduce the loss of data responses and may reduce the re-expressing of interests between the MN and the CN. The systems may comprise a plurality of PoAs or RPs configured to communicate with MNs and maintain forwarding states for the MNs to support seamless mobility. The forwarding states may be used to exchange a plurality of interests and/or data responses between the MNs and the network or between corresponding MNs in communications with one another. The PoAs or RPs may serve as anchor points that communicate with the MNs and between each other to transfer the forwarding states for the MNs that are on the move, such as when the MNs implement a handoff procedure to move between two PoAs.

FIG. 1 illustrates an embodiment of a CCN/NDN system 100 that supports seamless mobility. The CCN/NDN system 100 may comprise a MN 110, a CN 120, a plurality of base stations (BSs) 130, a plurality of access gateways 140, and a plurality of content routers 150. The CCN/NDN system 100 may comprise any number of such components. The MN 110 may be an end user device that has mobile access capability (via wireless communications). The CN 120 may be another fixed or mobile device that may be in a communications session with the MN 110. For example, the MN 110 and CN 120 may be mobile devices, such as a smartphones, that are involved in a conversation session (e.g., for Voice/Video or Two/Multi-Party Conferencing) with each other. In another example, the CN 120 may be a device, such as a content server, that is serving some content to the MN 110.

Content that is interested (requested) by the MN 110 may be obtained from the network or from a source (e.g., the CN 120), via the network. When the content is accessed at the MN 110, the MN 110 may be static (fixed) or mobile. The interested information may be available within proximity of the MN 110, for instance when the CCN/NDN comprises a mobile network or sub-network that includes a plurality of other mobile devices or MNs within proximity of the MN 110. In one example, the MN 110 may be part of an interconnected mass transit system (e.g., a wireless access system in a train, bus, or airplane) and the information may be obtained from one or a set of other MNs that are also part of this mobile sub-network.

In one scenario of the CCN/NDN system 100, the MN 110 which may be static or mobile may access content from the network. This scenario may be referred to herein as a content-access scenario. For example, an application on the MN 110 may access content, such as video objects or live streaming, where the content chunks may be distributed across the network. In another scenario, the MN 110 may be in communications or conversation with the CN 120. This other scenario may be referred to herein as a host-to-host communications model. For example, the MN 110 may be involved in a real time voice/video session with the CN 120, where either or both of the two may be mobile or static.

The MN 110 may attach to one of the BSs 130 (labeled BS-1, BS-2, and BS-3), which may be cellular network BSs. Alternatively, the MN 110 may be attached to other types of attachment points, such as attachment points of the Institute of Electrical and Electronics Engineers (IEEE) standard 802.11 networks. The BS 130 (or other attachment point) associated with the MN 110 may be coupled to one of the access gateways 140, which may communicate with and control communications of multiple BSs 130. In the CCN/NDN system 100, the network nodes may be NDN nodes, including the BSs 130 that may be also NDN enabled. In this case, the BSs 130 may be configured as PoA nodes (or PoAs) that communicate with the MN 110 at the NDN protocol layer (or NDN forwarding plane). Alternatively, the BSs 130 may not be NDN enabled but the nodes upstream to the BSs 130, including the access gateways 140 may be NDN enabled. In this case, the access gateways 140 that are coupled to the BSs 130 may serve as PoAs that communicate with the MN 110 at the NDN layer.

The need of seamless mobility in the CCN/NDN system 100 may be application driven. For instance, applications with more relaxed QoE requirements, such as web browsing, may not require the support of seamless mobility as the application timeouts and re-requests may be used to fetch the data. Applications with more stringent QoE requirements, such as conversational traffic, may require substantially constant rate playout to coders-decoders (codecs) to achieve expected user QoE. Handling seamless mobility for these classes of applications may justify additional control overhead that may be introduced to enable smooth transitions during mobile device handoff periods.

In the CCN/NDN system 100, applications and the NDN forwarding plane (or NDN layer) may use reliable Physical (PHY)/Media Access Control (MAC) layer connectivity. The applications may send interests for content into the network or may respond to the incoming interests with data responses to another host involved in a conversational session. During a handoff (also referred to as a handover) of the MN 110, undesirable situations may occur if the application or the NDN forwarding plane does not adapt to the situation where PHY/MAC layer connectivity is in transition from one BS 130 to another.

For instance, in the content-access scenario, if the MN 110 has pipelined a set of outstanding interests before the handoff, then the data responses may re-trace the path back to the old BS 130, and thus may not arrive to the MN 110 since the MN 110 may have already detached from the old BS 130. In the host-to-host communications model, if the MN 110 is serving interests expressed by a CN 120 or a fixed user of the network, then pursuing a default behavior that does not support seamless mobility during handoff may result in data responses that do not arrive to the requesting node. This situation may be detrimental to real time conversational sessions, since the scenario may lead into situations where the content may not be available to meet the playout schedule required by the application, resulting in poor QoE.

For example, the MN 110 attached to a first BS 130 (BS-1) may send interest for content associated with a first user (Alice-1), which may be forwarded through the network components at a first path (Path-1) to the content source, the CN 120. After receiving the interest, the CN 120 associated with a second user (Bob) may send the content back. The content may be forwarded (using PHY/MAC layer connectivity) by the components of the network at Path-1 to the MN 110 via BS-1. If the MN 110 moves from BS-1 to a second BS 130 (BS-2) and implements a handoff, then the interest and content forwarding may be repeated via BS-2 at a second corresponding path (Path-2). If the MN 110 moves from BS-1 to BS-2 and implements a handoff while still receiving content, e.g., during an active session with the CN 120, then the content may be lost or the content delivery may be delayed if this transition in PHY/MAC layer connectivity from BS-1 to BS-2 is not supported.

Typical handoffs may last for few seconds, during which the network may need to adapt to this situation to meet NDN's seamless mobility objectives. The CCN/NDN system 100 may be configured to support seamless mobility techniques using a combination of intelligent components or entities implemented at the MN 110 and at the network end. Specifically, the MN 110 may comprise a MA, which may be a software module. The MA may communicate with the applications (on the MN 110) that require seamless mobility support and with a PA on the network end to achieve seamless mobility. The fixed part of the network, for instance the BS 130, may comprise a PA, which may be a software module used to assist seamless mobility. The BS 130 that hosts the PA may serve as the PoA in the network for the MN 110. The PA may be aware of all the clients (MNs) the PA is serving at a given point of time. The PA may also be capable of communicating with another PA in the core network.

The access gateway 140 may be an aggregation point that controls multiple BSs 130, and may be a mobility aware node. In a wireless networking context, the access gateway 140 may implement several PHY/MAC and Open Systems Interconnection (OSI) model Layer 3 (L3) functions, which may be required to keep reliable connectivity between the MN 110 and the core network. The access gateway 140 may serve as the PoA and host the PA for the MN 110 instead of the BS 130. The CCN/NDN system 100 may also comprise a controller, which may be a centralized (software) component or entity that maps a client (identified with a unique ID) with the client's relative position in the network, for instance with respect to the PoA (the BS 130 or access gateway 140) that the client (MN 110) is homed (or anchored) to currently.

Figure 2:
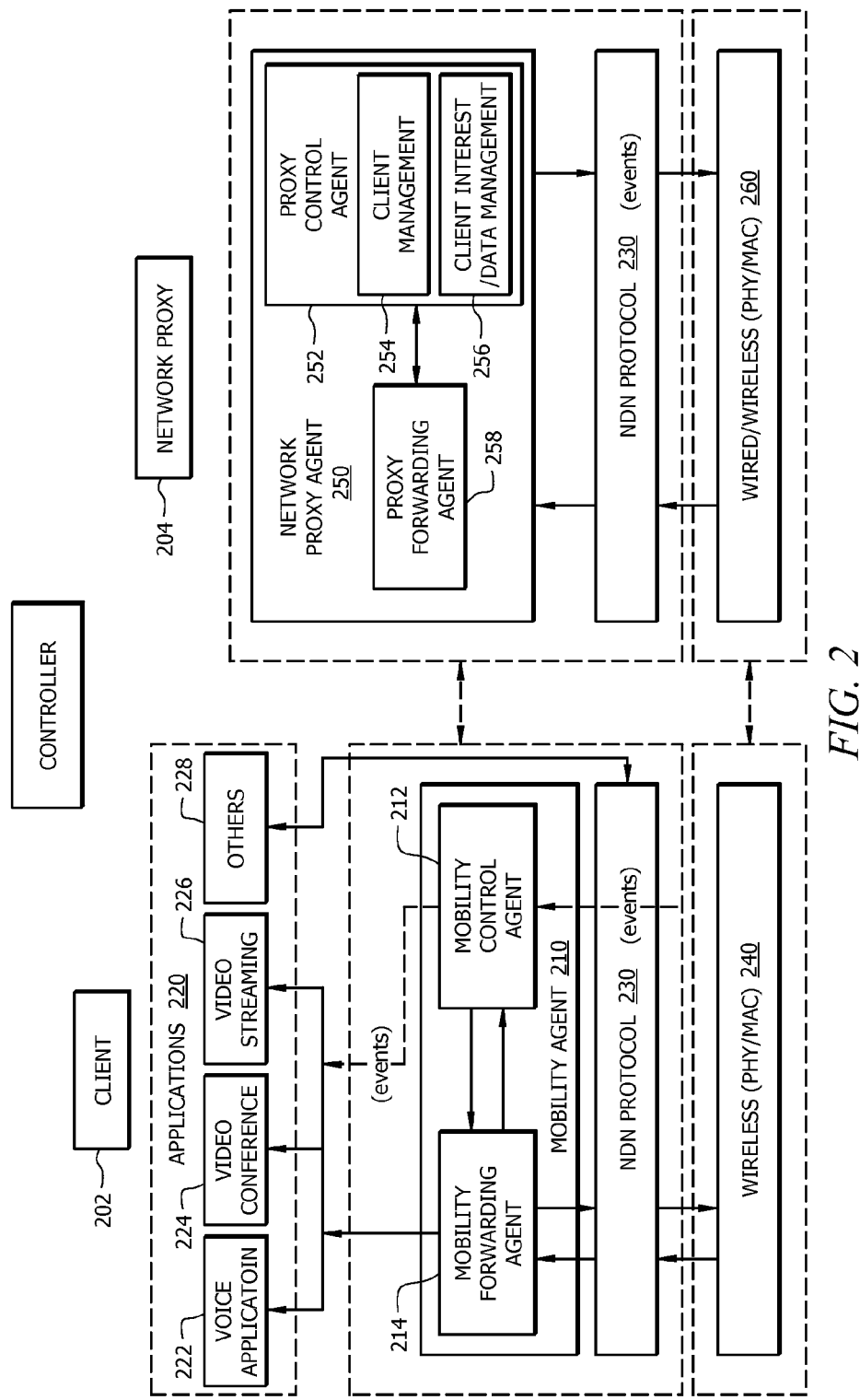
FIG. 2 is a schematic diagram of mobility agent and proxy agent components for handling seamless mobility according to an embodiment of the disclosure.

FIG. 2 illustrates an embodiment of MA and PA components 200 for handling seamless mobility in a CCN/NDN, e.g., the CCN/NDN system 100. The components may be software module components at a MN or client end 202 (e.g., MN 110) and the network or network proxy end 204 (e.g., the BS 130 or access gateway 140 serving as a PoA) to assist seamless mobility. The functions of the MA and PA may be separated into forwarding and control functions. At the client end 202, a MA 210 may comprise a mobility control component or agent 212 that implements a protocol (or logic) between the MN and a BS or access gateway that serves as a PoA to the MN to execute a plurality of control functions, such as MN registration/de-registration, notification messages during mobility, and other control functions. The mobility control agent 212 may also interface with a PHY/MAC connectivity layer 240, e.g., via a wireless connection, to receive events indicating various stages of the handoff process.

The MA 210 may also comprise a mobility forwarding component or agent 214 that may be involved in the processing of the interests sent out by a plurality of applications 220 of the MN, e.g., before sending the interests to a NDN protocol layer 230. The applications 220 may comprise voice applications 222, video conferencing 224, video streaming 226, other applications 228, or combinations thereof. The mobility forwarding agent 214 may also be involved in the processing of the data responses received from the NDN protocol layer 230, which may be forwarded to the applications 220 using the mobility forwarding agent 214.

The NDN protocol layer 230 may implement a NDN forwarding plane protocol and may communicate with the PHY/MAC layer 240 to receive events indicating various stages of the handoff process. The applications 220 may also choose to register with the MA 210 to receive such notifications. This may enable the applications 220 to adapt to situations where there may not be any provisioned resources for communicating with the PoA (a BS or gateway) and to adapt to varying connectivity property as a result of moving from one radio technology to another (which may be referred to as heterogeneous mobility). The applications 220 may leverage the MA 210 to allow seamless transition during the handoff phase. In some cases, only some of the applications 220 may leverage the MA 210, since the mobility may introduce some control and computational overhead which may not be justified considering the need of some other remaining applications 220 that have relaxed QoE requirements. Such other applications 220 may rely on their own timeouts to recover from session discontinuity.

At the network proxy end 204, a PA 250 may comprise a proxy control agent 252 that manages a plurality of MNs that may be homed (anchored) or attached to the BS at a given point of time, keeps track of associated states in terms of mobility properties, and executes the logic required to achieve seamless mobility. The proxy control agent 252 may comprise a client management component 254 and a client interest/data management component 256 that handle some of the operations of the proxy control agent 252. The PA 250 may also comprise a proxy forwarding agent 258 that participates in the processing of the control and data related interests and the data responses received and sent out by the network proxy agent 250. The PA 250 may communicate with the NDN protocol layer 230 for forwarding data. The NDN protocol layer 235 may in turn communicate with the PHY/MAC connectivity layer 240, e.g., via a wired or wireless connection. The objective of the forwarding elements of the MA 210 and the PA 250 may comprise minimizing or reducing the states maintained and minimizing or reducing the introduced delay as a result of the processing of interests and data responses.

A plurality of seamless mobility techniques or schemes may be implemented in the CCN/NDN (e.g., the CCN/NDN system 100) based on a make-before-break strategy, where necessary tasks are carried out to minimize the loss of interests and data responses sent by a MN (e.g., the MN 110) or a CN (e.g., the CN 120) during a handoff phase from one BS (e.g., a BS 130) to another.

Figure 3:
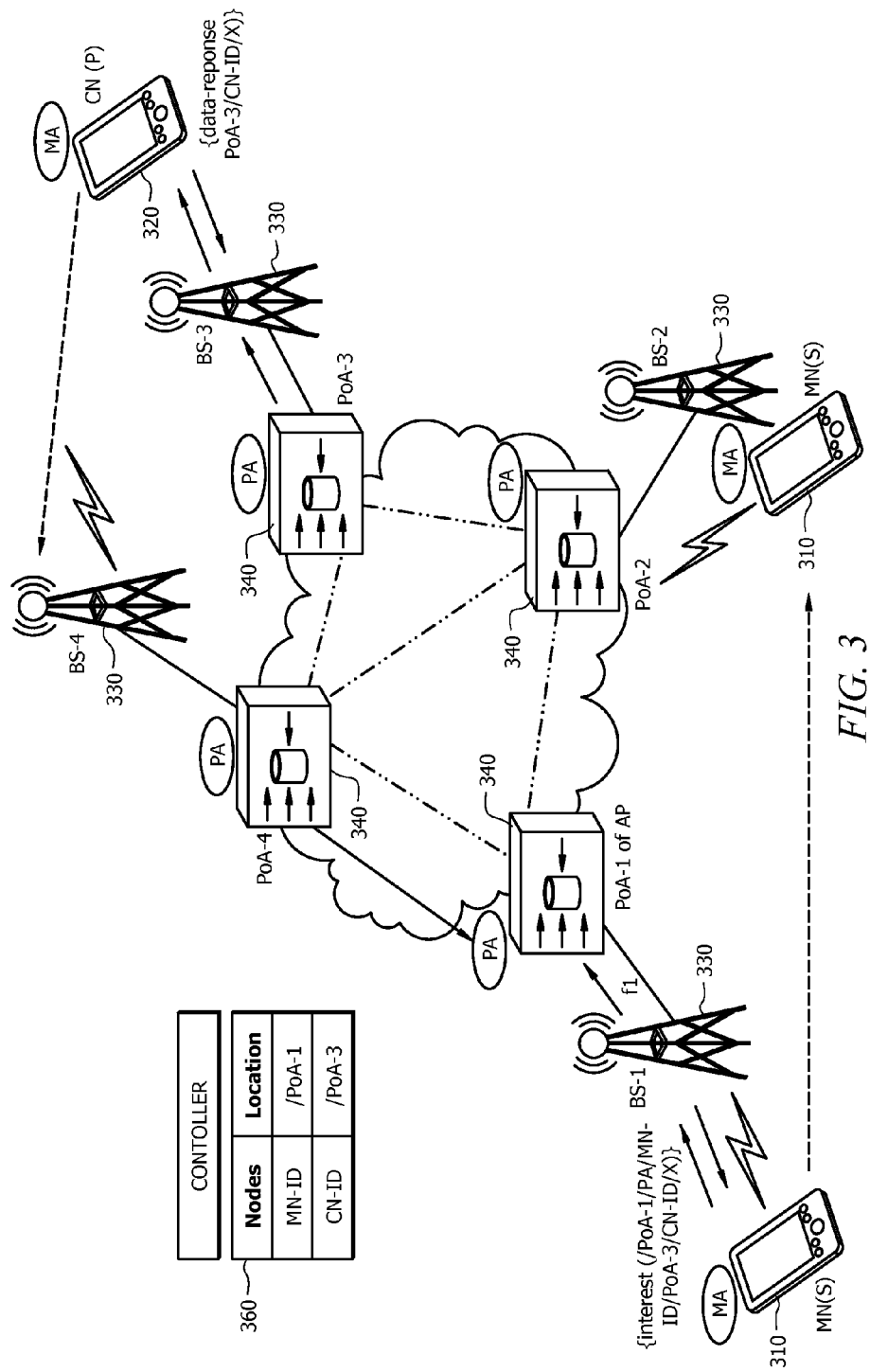
FIG. 3 is a schematic diagram of a PoA based seamless mobility scheme according to an embodiment of the disclosure.

FIG. 3 illustrates an embodiment of a PoA based seamless mobility scheme 300, which may be implemented in the CCN/NDN to support seamless mobility for MNs, such as during the MN's handoff operation between BSs. The PoA based seamless mobility scheme 300 may use a MA at a MN 310 and PAs on multiple PoAs associated with a handoff of the MN 310, which may be access gateways 340 or BSs 330, to enable seamless mobility. The MN 310 may obtain content from the network or from the CN 320 via the network. The PoA based seamless mobility scheme 300 may be implemented similarly to any of the MNs 310 or CNs 320, as described in detail below.

The scheme 300 may correspond to a content-access scenario where content may be static content and may be accessed by a mobile MN 110 (on the move). The static content may be at a static (or fixed) source (e.g., a content server of a fixed CN 320) or cashed in one or more content routers of the network. An application on the MN 310 may request/receive content from the network or CN 320 when the MN 110 is attached to a first BS 330 (BS-1). While still in the session, the MN 310 may implement a handoff to move to a second BS 330 (BS-2). The PoA based seamless mobility scheme 300 may allow PoA-2 (e.g., by the time the handoff is complete) to obtain all or at least a partial set of the outstanding interests from BS-1, so that when the MN 310 re-seeks the corresponding content, the contents may be obtained directly via BS-2 instead of traversing the network (from BS-1 to BS-2) to obtain the content. The MA at the MN 310 and the PA at a first PoA (PoA-1) associated with the MN 310, e.g., a first access gateway 340 or BS-1, may be registered to the NDN layer at the network. The NDN layer may be configured to create appropriate faces to the MA and PA in corresponding internal Pending Interest Tables (PITs).

In an initial bootstrapping and normal operation phase, the MN 310 may home itself with the PoA closest to the MN 310 (e.g., in terms of radio signal strength), for example PoA-1. The MN's 310 MA may be provisioned with required forwarding state to communicate with the PA of PoA-1 (e.g., BS-1 or the access gateway 340 coupled to BS-1). PoA-1 may push out the required forwarding details during a Layer 2 (L2) attachment phase (between MN 310 and BS-1), which may be forwarded to the MA of the MN 310. The MA may then create a NDN forwarding entry (e.g. /PoA-1/PA) in the MN 310. This may allow any control or data related interests to be sent to the PA of PoA-1.

The MN's 310 MA may send a registration message to the PA of PoA-1. The information in interests sent by the MN 310 may comprise a unique ID for the MN 310, such as a device ID, a human readable name, etc. The PA may request the CCN/NDN to create a face for the MN 310, which may result in creating an entry in the network's Forwarding Information Base (FIB) table 360 (at a controller plane or centralized component). The entry may be in the form of /<client-id>/ MA. The face information may also map to the L2 constructs to make the communication possible. This may allow the PA to forward any control related interests to the MN 310 using a name-prefix, which may comprise the MN's 310 ID. As such, the FIB 360 may scale (or expand) in a linear manner with the number of MNs that are managed in the FIB 360. This may be a reasonable requirement since the PoA may be typically required to scale up to few hundred or a thousand MNs within the PoA's cell radius.

The PA may respond to the registration request by notifying the MN 310. More granular components of the prefixes may be used for correspondence with the PA. The prefix may take the form /PoA-1/PAkMN-ID>. The PA may also create another FIB entry to allow any interest sent by the MA with this prefix to be forwarded to the PA for further processing. This may allow the PA to keep state information for each client in terms of both interests and the data response bound to that particular client device. These interests may include both control and interests corresponding to content access. The control related interests are handled by the proxy control agent of the PA (e.g., the proxy control agent 252 of PA 250).

For the interests corresponding to a content-access request (for content X) by the MN's 310 application, the PA may prepend the original interest with the prefix supplied by the PoA-1 (such as /PoA-1/PA/MN-ID) and issue out a new prefix (/PoA-1/PA/MN-ID/X) on behalf of the application. Further, different prefix components may be added to differentiate between the control plane and content-access interest packets. For instance, PoA-1/PA/MN-ID/Control/ may be used by the MA to issue control messages to the PA. This may require the MN 310 to keep a mapping between the applications that the MN 310 is serving and the outstanding interests. Issuing out an interest with the modified prefix name may allow matching the interest with the FIB entry inserted by the MA, and in creating appropriate PIT entry mapping to the MA's face.

The issued interest may then be sent up to the PoA's NDN layer, which may match the interest with the NDN layer's FIB entry created by the PA for this client, and receive the interest. The PA may keep a state for the outstanding interest for each client that may be registered to the PA at that point of time. The PA may then strip out the prefix prepended by the MA, and send out the original interest with a modified prefix attached to it, while keeping the mapping between the interest prefix from the MA and the modified original prefix. If multiple MNs are communicating with the same CN, then the original prefix X may be used to suppress the multiple requests, while keeping context of all the users who are seeking the same content. This may ensure that only one interest is forwarded into the network at a time from the PoA. Instead of flat matching, another efficient data structure may be considered in this regard.

When PoA-1 receives a data response for the interest X, a way to associate the data response with correct client's context may be needed, since multiple clients may be served by the PA. The interest X may then be compared to the outstanding interests for all the active clients, and a new data response may be generated by prepending the prefix to X. Multiple matches may be used, which may imply that multiple clients have expressed content interest for the same prefix X. The new data response may be prefixed with the modified prefix and made available to the MA in the MN 310.

The MA's mobility forwarding agent (e.g., mobility forwarding agent 214) may have the task of mapping the incoming interest to the correct application. As in the case of the PA, the MA may also manage contexts for multiple applications. The prefix of the incoming data response may then be matched with the outstanding interests for each application using MA. It may be improbable at the MN 310 that more than one application could match the same data response. When the match is found, the data response may be made available to the respective application.

Considering the states in the MA and the PA, the management of the interests in the PA and the MA may need to be in sync with the expiry of entries of the NDN PIT, as much as possible. This may be achieved by registering to the NDN layer service, which may enable notification any time a PIT entry expires. This may be enabled by appropriate call backs to the MA and PA to notify about the expiry of entries. If the application needs to send duplicate interests, the interest may be filtered out by the MA, since the NDN layer may have a state for the interest.

In addition to handling the interests/data responses from the applications, the MA may also handle the control plane protocol messages to and from the mobility control agent and the PA. The mobility control agent may issue control messages to the PA. The messages may use a different type of prefix that allows the proxy forwarding agent to know that the control messages need to be handled by the proxy control agent of the PA.

The, seamless mobility actions may be triggered when the MN's 310 mobility control agent (at the MA) gets a notification from the L2 MAC layer about the initiation of the handoff for the MN 310. In order to prevent any loss of interest packets from the application, the mobility control agent may notify the NDN layer to stop issuing any more interests, for instance except the control commands required to handle seamless mobility. This may be enabled using certain filters over the prefixes that may pass through the face between the MA and the NDN layer. The data responses that may be arriving at the MA from the NDN may be processed in a typical manner (as in normal operations). The data responses may be arriving before the handoff notification is sent to the PA.

The mobility control agent may then refresh the outstanding interests within the mobility forwarding agent for each of the applications with a longer expiry period (e.g., empirically estimated based on the time required for the handoff). Such a local refresh may also be issued to the NDN layer if the interest expiry is set to less than the expected handoff duration. This may ensure that the entries for outstanding interests do not expire and the states may still exist for the data responses that may arrive from the network as part of the seamless mobility management process.

The MA may then send a de-registration interest message to the PA of PoA-1. The message may comprise the client's ID and the message type that indicates the fact that the client (MN 310) is moving to another PoA (e.g., BS 330 and access gateway 340). The PA may keep track of the interests that are outstanding for its clients, and may identify the outstanding interests for each client based on the client's ID. The MA may stop sending out its interests addressed to the PA, and hence the PA may stop receiving any more interests from the MN 310. Since the MN 310 may be moving, the PA may also issue out local refresh of the interests that may be pending for the MN 310, and similarly a local refresh to the NDN layer. The NDN PIT may comprise the state for the interests with a modified name that was originally received from the MA. The entries may not be of use at this point and may be allowed to expire based on the original setting.

Any data responses for the original pending interests (for content X) may hence be cached with longer expiry period. The previous PIT refresh for these outstanding interests may also indicate longer expiry period when the content is stored in a content store (CS). Handling cached data may be assigned to the PA for further processing. The PA in the old PoA (PoA-1) may not take any further actions, until further notice from the new PA in the new PoA (PoA-2) to which the MN 310 moves to. The PA may also issue notification to the NDN to delete the face associated with the MN 310. This may remove the FIB and PIT entries that have this face as the next hop entry. The MN 310 may also delete the face to PoA-1. This may delete all the outstanding interests in the PIT and FIB using this face.

During the registration process with PoA-2 (to which the MN 310 moves to during the handoff), the same form of bootstrapping operation described above that allows the MA and the PA to establish communications with each other may be implemented. This may complete the registration process with the new PoA (PoA-2). After sending the registration message to PoA2, the MA may notify PoA2 of its attachment with the previous PoA (PoA-1), and notify PoA-2 of any data responses corresponding to the pending interests that needs to be retrieved from PoA-1. Hence, PoA-2 may create a new FIB entry in FIB 360) to attract interests that may be coming in from the PA of PoA-1. The PoAs may be routable using their names in the core network (one or more content routers of the CCN/NDN).

In some wireless MAC layer specifications, such as IEEE 802.11, when the handoff is triggered in the MN 310, the MN 310 may lose the capability of communicating with its old PoA. In this case, the de-registration message may be sent through the PA of the new PoA, although this may be at the cost of some latency in comparison to triggering the seamless mobility action at the PA of the old PoA. This may be executed after the registration phase with the new PoA.

Subsequently, PoA-2 may retrieve the data responses form PoA-1. The PA in PoA-2 may prepare to retrieve the data responses for the outstanding interests for the MN 310. The PoA-2 may send an interest to the PA in PoA-1 seeking the outstanding interests for the MN 310. When the core network is a high speed network, this information may be returned as a data response by the PA in PoA-1 to PoA-2 with minimum latency. The data response may encode all the pending interests (for content X) outstanding for the MN 310 in the PA of PoA-1.

When the PA in PoA-2 knows about the outstanding requests, the PA may save the requests for the MN 310 and begin sending interests to PA in PoA-1 for the corresponding data responses. The interest packets may be addressed to the PA in PoA-1 with the identity of the MN 310 and the outstanding interest (for content X) for which the data responses are being sought. When the PA in PoA-1 receives such a request, the PA may fetch the corresponding data response from the CS and generate a response to the PA in PoA-2.

The PoA-2 may then keep states for these interests for the MN 310. These interests with their corresponding data responses may be marked, so that the interests for the pending content may be retrieved and sent to the MA with minimum latency. PoA-2 may attempt to retrieve as many outstanding interests as possible from PoA-1. When all the pending data responses have been acknowledged, or if a pre-determined number of data responses are obtained, the PA in PoA-2 may notify the MA in the MN 310 to request for those outstanding interests.

Subsequently, the MN 310 may re-express the interests for content. When the MA receives a notification from the PA about re-issuing requests for the outstanding interests, the MA may re-express the outstanding interests (X) to the PA of PoA-2 using the prefix /PoA-2/PA/MN/X. The interests may be tagged to indicate to the PA that these are outstanding interests. This may allow the PA to execute actions for the data responses that the PA retrieved from the old PoA. When the PA receives the interests, the PA may first match the interests (X) with those that have been retrieved from the older PoA. If a match exists in the CS, the PA may generate a data response which the MA receives and forwards to the respective application. If no data response has been received from the old PoA, and hence no corresponding content in the CS, then the received interest may be treated as a new interest and follow normal operation.

Instead of the MA being notified by the PA to re-issue the pending interests, the MA may start doing so after a predetermined wait period after the notification from L2. As these interests are flagged, the PA may respond to the interests for which the PA has received response from PoA-1. The other interests may be forwarded as typical interests as described in the normal operation mode above.

Figure 4:
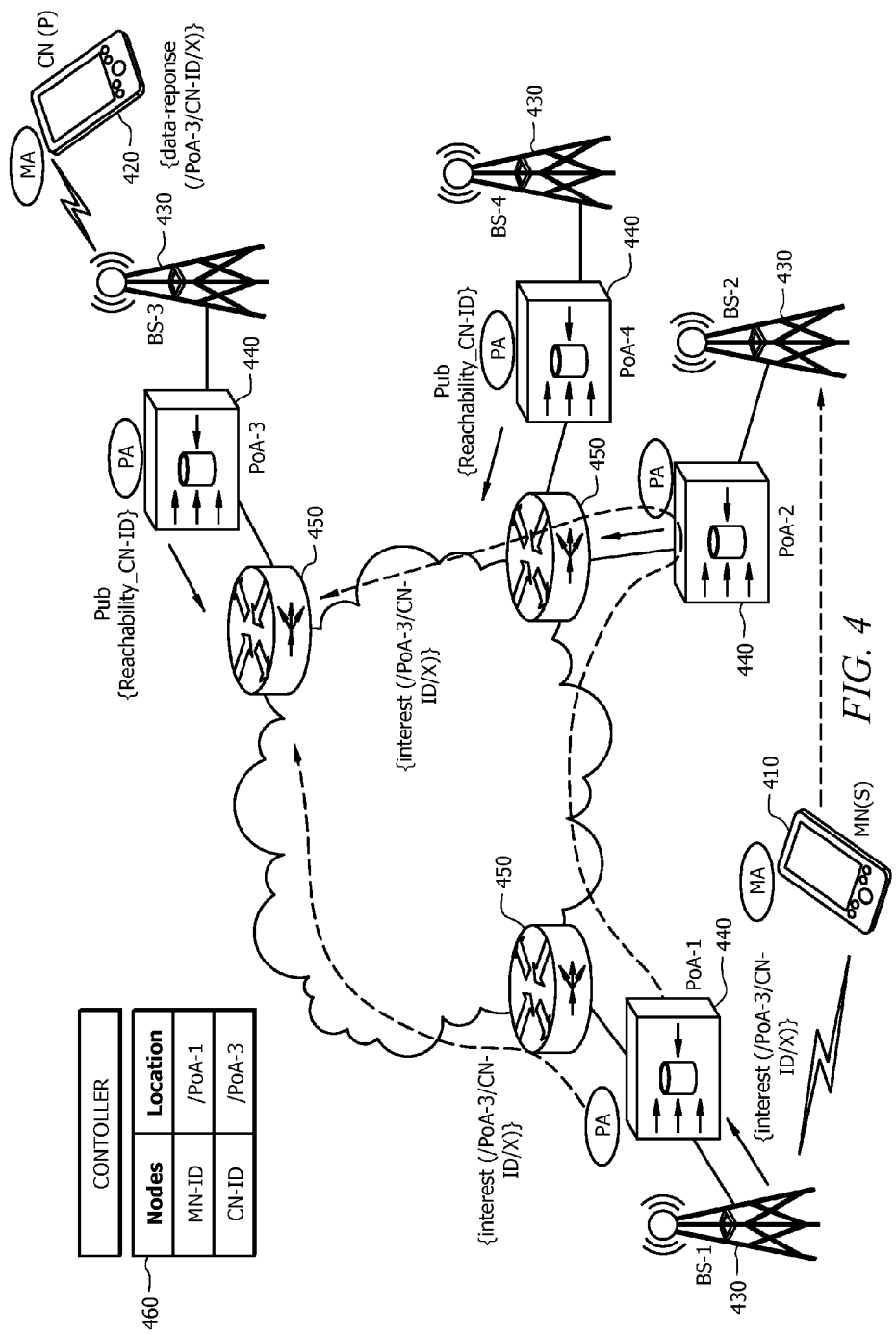
FIG. 4 is a schematic diagram of another PoA based seamless mobility scheme according to an embodiment of the disclosure.

The above scenario may be implemented to handle seamless mobility for a mobile MN 310 accessing static content. FIG. 4 illustrates an embodiment of another PoA based seamless mobility scheme 400, which may be implemented in the CCN/NDN to support seamless mobility. The scheme 400 may correspond to a host-to-host mobility scenario where the MN may be static (not on the move) and the content may be mobile. The PoA based seamless mobility scheme 400 may use a MA at the CN 420 and PAs on multiple PoAs, which may be access gateways 440 or BSs 430, and a FIB 460 (at a network controller) to enable seamless mobility. The CCN/NDN may also comprise one or more content routers 450 (at the core of the network).

Specifically, a MN 410 may be fixed (not on the move) but may access mobile content, such as when the interested content or part of the content is obtained from a mobile CN 420. Alternatively, the MN 410 may be static but part of a mobile sub-network. The MN 410 may know about such mobile content, e.g., through offline mechanisms. For instance, the user of the MN 410 may know about the mobile content through personal correspondence. Alternatively, the network may resolve this information for the user's application that searches for this content. In some cases, such content may not be cacheable in the network due to privacy reasons, and hence may be obtained from a CN 420. The resolution of such content (X) may be relative to the content attachment point or PoA, such as /PoA-X/CN/X, or relative to the sub-network, /PoA-X/SN/CN/X.

This host-to-host scenario may comprise two phases. One phase may correspond to when the session to access content from the CN 420 begins and leads to a normal operation mode, as described above. The second phase may correspond to when the mobile CN 420 moves (between BSs 430). This scenario may occur when the CN 420 moves out of the range of one PoA and enters into the range of another PoA and implements a handoff. In this case the seamless mobility operation may be triggered so that the corresponding MA and PA for the CN 420 keep track of the incoming interests (from the MN 410) and ensure that data responses take advantage of the path established by the incoming interests. This scenario may be referred to as host-to-host scenario.

In yet another host-to-host scenario for mobile content, the content (and not a CN 420) may move around from one CN 420 to another CN 420. If the MN 410 is in session with a first CN 420 and the content moves as such, then the application in MN 410 may be notified about such a situation. This may allow the MN's 410 application to resolve the new content location and issue the new interests with the prefix pointing to the new relative position.

The MN 410 may be fixed and in a communications session with a mobile CN 420, (e.g. a Voice over CCN (VoCCN) or video session), and the host-to-host scenario may handle incoming requests for content in the CN 420 from an application of the MN 410. The host-to-host scenario may also handle outgoing interests from the MN 410, similarly as described in the content-access scenario of FIG. 3. The combination for handling both incoming interests (at the CN 420) and outgoing interests (from the MN 410) may be needed to support host-to-host mobility where applications are involved in a session. As such, the MAs (at the CN 420 and MN 410) may be configured to provide seamless mobility to the applications for both the content-access and host-to-host mobility scenarios.

To establish a host-to-host session, the two parties (MN 410 and CN 420) may first resolve each other through the network. The resolution may be triggered by the application in the MN 410 (or CN 420) seeking resolution for the CN 420 (or MN 410) to the corresponding MA. The MA may act as the service point to resolve the location or remote nodes. The MA in the MN410/CN420 may then contact the PA, which may then anycast such a request or apply a centralized approach to resolve the remote node. Initially, the MN 410 may be attached to one PoA (a first BS 430 and corresponding access gateway 440), PoA-1, and the CN 420 may be attached to another PoA (a second BS 430 and corresponding access gateway 440), PoA-2. In a normal operating mode, the application involved in a host-to-host communications scenario may issue out interests where interest packets may be prepended with the relative position of the remote node. This mode is described in detail below. Alternatively, if there is a desire to make the application completely unaware of the location information, then this function may be executed by the MA, where the MA may keep state for each application.

The MN 410 may issue out interests prefix beginning with /PoA-2/CN/X, where X is the interest to the application in MN 410. This may be modified by the MN's 410 mobility forwarding agent to /PoA-1/PA/PoA-2/CN/X. The interests may be forwarded to the PA at PoA-1, which may keep track of the interests issued by the MN 410, and re-issue the interests so that the PA at PoA-2 is aware of these incoming interests. The interests may be issued as PoA-2/PA/CN/X. Since the core network is aware of routing to the PoA nodes, the interests may be correctly forwarded to PoA-2.

When the PA receives the interest, the PA may issue a new interest to the CN's 420 MA, e.g. with prefix /CN/MA/X. PoA-2 may have a forwarding entry to route packets to the CN 420 (e.g., in the form of /CN/MA). Thus, the interest may be received by the MA in the CN 420, which may use the context of X to handle the interest over to the correct application. The application in the CN 420 may then receive this interest and generate the appropriate data response for X, which may be sent to the MA in the CN 420. The MA may then prepend the prefix /CN/X to the data response, trace it back to the PA of PoA-2, and map /CN/X to /PoA-2/PA/CN/X. The data response may then be sent to the PA in PoA-2, which may map the data response to /PoA-1/PA/PoA-2/CN/X. The data response may then be forwarded to the MA on the MN 410, which may hand the data response to the application with the prefix /PoA-2/CN/X. The same process may be used in the reverse order from the CN 420 to the MN 410.

The PA of PoA-1 may distinguish between the host-to-host and content-access scenarios described above. For instance, the PA may distinguish between the two scenarios using an indication in the interest, e.g., inserted by the MA in the MN 410. When the MN 410 is fixed and the CN 420 is moving, the MA and the PA at the CN's 420 end may be configured to ensure that the path traced by the interests from and to the CN 420 may be re-used as much as possible.

The CN's 420 MA may be aware of the interests that have been received for the different applications that the MA may be serving. When the MA is notified of a handoff by the CN 420, the MA may notify the applications about the handoff, e.g., if the applications have registered for such notification. If the applications are handoff aware, the applications may stop issuing the data response for the incoming interests. Otherwise, the applications may continue to generate data responses for the pipelined interest, which may be received and cached by the MA. The MA may then notify the PA about the client mobility by issuing out a de-registration message. The PA may have the state for both the incoming interests from the CN 420 and the interests received from the MN 410. The PA may set these outstanding interests to a longer expiry time. During the handoff, the MN 410 may not be yet aware of the CN's 420 mobility, and hence may continue to issue interests. These interests may be cached by the PA, and may not be forwarded to the CN 420. The PA in PoA-2 may then wait for further action to be notified by the new PoA.

When the CN 420 re-homes with a new PoA (e.g., PoA-4), the MA in the CN 420 may contact the PA to notify the PA of the CN's 420 previous PoA (PoA-3). The PA may then contact the old PoA and notify the old PoA of the CN's 420 new position. The PA in PoA-3 may begin to express interests for the outstanding interests from the MN 410 that require data responses from the CN 420. The interests may be directed to the PA in PoA-3. The PA may then keep track of the incoming interests, and issue a new interest in the form of /PoA3/CN/MA/X. The MA may then look into its own cache to see if there is a corresponding data response. If not, then the MA may forward the interest to the application for the data response. In this case, PoA-2 may serve as the home agent until the MN 410 may be updated about the CN's 420 new location.

After the handoff of CN 420, the MA in the CN 420 may update its applications about such a change. The MA may then update the controller (e.g., if a centralized system is used for tracking the mobile nodes) of its new location. The MN 410 may be notified using one of the two ways. In a first implementation, if the applications are aware of the locations of the remote peer, the applications may issue out a request directly to their peering applications in the form of interests. This may be similar to any other interest sent out between two applications. In a second implementation, if the applications are not location aware of the remote peer, then there may be two situations. If the MA in the CN 420 can communicate with the MA in the MN 410, then the MN 410 may update the CN's 420 MA of the new location directly by sending an interest with prefix /PoA-1/MN/MA/X, which may include information to request updating the MN's 410 MA of the CN's 420 new location. Alternatively, if the MAs cannot communicate directly, then this signaling may be achieved via the respective PAs. As such, the interest may be addressed to the PA of PoA-3, which may contact the PA of PoA-1, and then forward the interest to the MA in MN 410.

Figure 5:
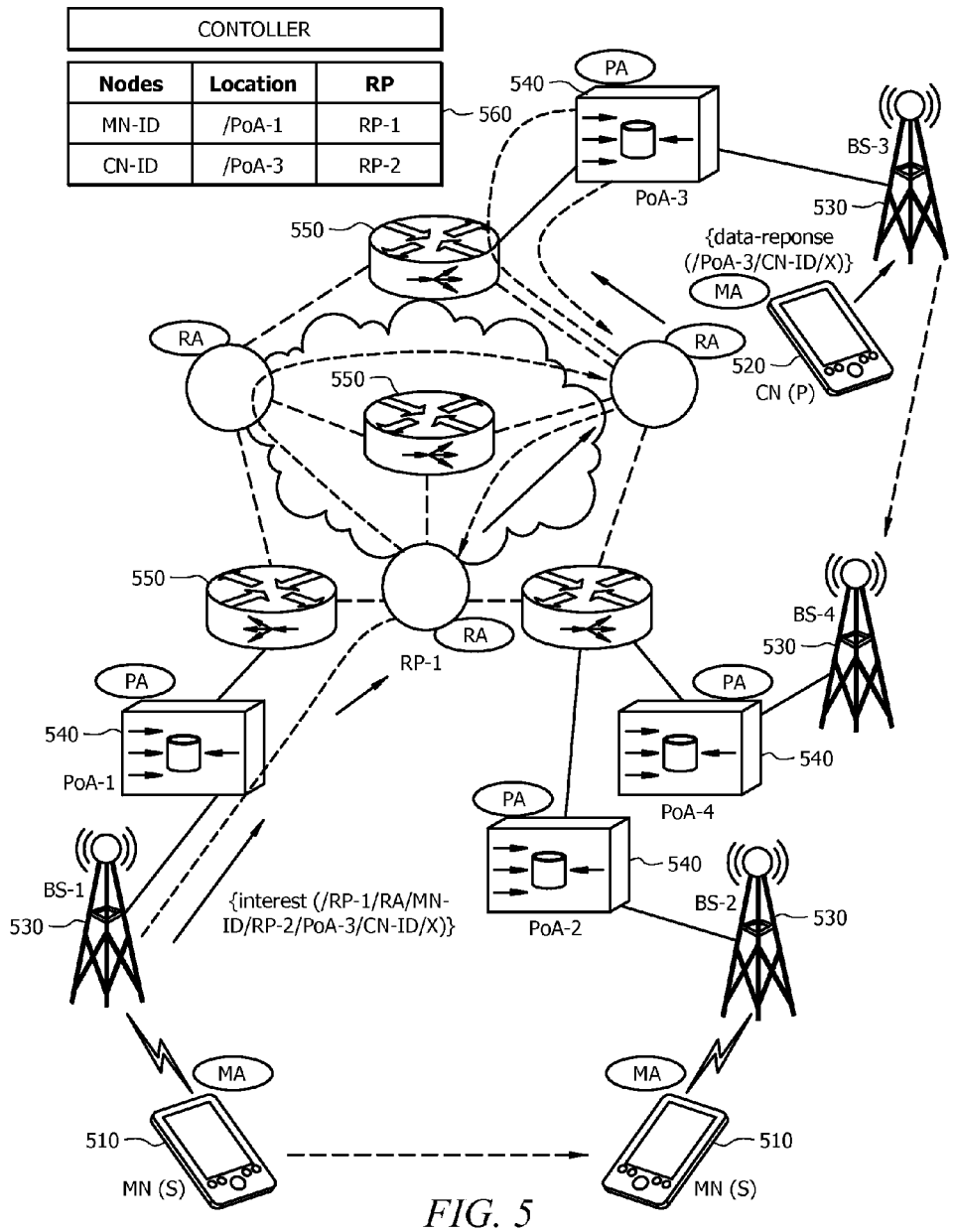
FIG. 5 is a schematic diagram of a RP based seamless mobility scheme according to an embodiment of the disclosure

FIG. 5 illustrates an embodiment of a RP based seamless mobility scheme 500, which may be implemented in the CCN/NDN to support seamless mobility for MNs, such as during handoff operations between BSs. The RP based seamless mobility scheme 500 may comprise a MN 510 that may implement a MA, a CN 520, a plurality of BSs 530 and access gateways 540, a plurality of content routers 550 at the core network, and a centralized network controller that may maintain a FIB 560. The difference between the RP based seamless mobility scheme 500 and the PoA based seamless mobility schemes above is the presence of selected core routers in the network (content routers 550) that may also have a function to support seamless mobility. Such routers are referred to herein as RPs. The RPs may be strategically selected in the network, for instance along the edges of the network in the path between connecting two adjacent PoAs (e.g., access gateways 540 or BSs 530). For instance, the RPs may be chosen using long term global network objectives or short term local optimization objectives.

Handling seamless mobility at intermediate points (the RPs) in the core network, which may be equidistant from the old and new PoAs (during a handoff procedure) may be better than handling seamless mobility at the PoAs (as described in the schemes above). There may be several factors for using the RPs. For instance, the PoAs (e.g., BSs 530) may not be able to communicate with one another directly. Further, the PoA may not be a NDN node, such as in the case of IP based PoAs. Even if the PoAs (e.g., BSs 530) are NDN enabled, the PoAs may not support mobility management function. In this case, access gateways 540 that manage a set of PoAs (BSs 530) may perform mobility management. The RPs may be selected in the network in several ways. One way is to choose the RP considering global optimization objectives. This approach may be based on inputs, such as network topology, user behavior, current traffic pattern, or other inputs, e.g., with the objective of globally minimizing the delay during handoffs between any pair of BSs 530.

In another scenario, the RP may correspond to an access gateway 540, which may simplify the routing complexity to handle seamless mobility. Another approach to choose the RP may be to do so dynamically by the PoA, such as each time a MN 510 registers with that PoA. In this case the PoA may use local optimization criteria considering the network topology and local topology, such as the geographical location of adjacent PoAs. Further, the PoA may treat a roaming client different from the PoA's own subscribers, and hence may physically separate the RP used to service the roaming clients from the RP used to service the PoA's own subscribers.

The scheme 500 may have an initial bootstrapping and normal operation phase similar to the scheme 300 above. Additionally, in the scheme 500, the RP (e.g., in the core network) may be enabled with a RP agent (RA) to handle mobility of clients that the RP supports. The RA may serve multiple PoAs, and thus the clients corresponding to the PoAs. The PA and the RA may communicate to exchange the control messages to deal with mobility of the clients managed by the PA. One difference from the scheme 300 is that in the scheme 500, the PA may not take part in handling the application interests from the MN 510. Instead, the interests may be handled by the RP. In this case, the RP functions may replace at least some of the PA functions and the RP may comprise the components of the PA 250 described above (in FIG. 2) instead of the PoA.

When the MN 510 registers with a first PoA (PoA-1), PoA-1 may report the closest RP that can be used for interest forwarding, in addition to exchanging information related to establishing communications between the MA and the PA. When the MN 510 is registered with the PA, the MA may have to prepend the interest prefix from the application in the form /RP/RA/MN-ID. Hence, the interest for content X from the application may be /RP/RA/MN-ID/X. This may force the interests to go through the RP, which may be handled by the RA.

When the RA receives an interest from the MA in the MN 510, the RA may remove the prefix prepended by the MA, and issue the interest (X) on the behalf of the MN 510. The RA may further keep a mapping of the prefix of the interest issued by the MA to the original interest X. When the data response for X is received by the RA, the prefix may be restored to what was expressed by the MA and a new data response may be issued to the MN 510. This data response may then trace back to the MA in the MN 510, which may map the data response to the correct application using prefix X. The RA may be aware of the interests that are outstanding for the MN 510, and as such may be capable of handling seamless mobility.

The handoff may be triggered when the mobile control agent in the MN 510 gets a notification from the L2 MAC layer. The MA may then notify the NDN to stop issuing any more application interests, for instance except the control commands required to handle mobility. When the MN 510 de-registers with PoA-1 using a notification containing the MN's 510 own ID, this control information may be forwarded to the RA by the PA. As the RP is aware of the client that the RP is serving, the RP may take similar actions as the PoA, as described in the scheme 300. The RP may identify the interests and set them to a longer expiry time. This may also be applied for the outstanding interests in the PIT locally. The future data responses for the interests may be cached in the CS, and no more data responses may be issued by the RA to the MN 510.

When the MN 510 registers with PoA-2, the MN 510 may notify PoA-2 of the last RP that it was mapped to earlier (in addition to the MN's 510 own ID). The PA in PoA-2 may then notify the RA in the RP about the MN's 510 new location. The PoA-2 may allow the MN 510 to use the same RP, e.g., for a period of time after the handoff until the MN 510 has transitioned fully out of the handoff phase. In the case the PoA-2 is provisioned to use only its own MN 510 for all its client, irrespective of the client's mobility considerations, procedures similar to the scheme 300 may be applied. In this case, the two RPs may communicate with one another to support seamless mobility for the MN 510 as it moves between two corresponding PoAs.

After registration, the MN 510 may start re-expressing its outstanding interests to the RP. If the RP associated with MN 510 is not changed, the application's outstanding interests name may be expressed without change. Since the name is prepended with the RP name-ID, the interests may be forwarded to the same RP, which may identify the outstanding requests considering the saved state information. The RP may fetch the already cached data from the NDN and create appropriate data responses for the MN 510. The future interests may then be forwarded as usual through the RP.

If the old RP servicing the MN 510 before the handoff is not the optimal or best efficient RP, e.g., from a topological perspective with respect to the new PoA, the new PoA may notify the MN 510 to use another RP based on the PoA's optimization objectives. When PoA-2 notifies the MN 510 about the change in RP, the PoA-2 may also notify the old RP about de-registering the MN 510. This is may be achieved by the MN 510, e.g., after all the outstanding interests have been responded by the old RP.

In the case the content is mobile, such as content from a mobile CN 520, then a host-to-host mobility scenario may be implemented as described below. Otherwise, if the content itself has moved (e.g., to another CN 520) because the content location has changed, then the content may be resolved by the requester (e.g., the MN 510). In a host-to-host mobility scenario where the MN 510 may be static and the CN 520 may be mobile, the RA in the RP may only deal with the requests issued from the MN 510. There may be situations in the host-to-host scenario. In a first situation, the RP for both the MN 510 and the CN 520 may be the same. In a second situation, the RPs for the MN 510 and the CN 520 may be different.

In the first situation, during the normal operation phase, the MN 510 and the CN 520 may use the same RP. The interests going out from the MN 510 to the CN 520 may be saved in the RA. When the MN 510 moves, the MN 510 may notify the RA about the MN's 510 de-registration to the old PoA and registration to another PoA. Upon its notification, the RA may stop sending out any more new interests to the MN 510, and instead may save interests. When the MN 510 attaches to the new PoA, the MN 510 may start sending out responses to the RA, where the new PoA may allow the usage of the old RA, e.g., until the MN 510 transitions through the handoff and becomes able to send out the outstanding interests and recover responses for its own outstanding interests.

In the second situation, the MN 510 and CN 520 may not use the same RP. In this case, without global (network) knowledge of which RPs are being used by the MN 510 and CN 520 respectively, it may be difficult to address the issue of the outstanding interests. One way to address this may be to allow the PoAs to also keep state of the interests sent and received from the MN 510 and the CN 520 respectively. However, typically, the PoAs may not be configured to maintain the state of the outstanding interests. Instead, each of the MN 510 and CN 520 may be configured to be aware of the RP being used by the other party. This may be enabled by extending the network controller function where in addition to mapping the MN 510/CN 520 location to the PoA, the controller may also map the RP that the MN 510/CN 520 is mapped to. Thus, when the application attempts to resolve the location with the MA, the MA may also obtain information of the RP that is being used by the remote peer.

In the case where the application is not aware of the remote peer's location, the prefix may be changed by the MA (instead of the application). In the case where the MN 510 is static and the CN 520 is moving, if the MN's 510 application is made aware of the peer's location, e.g., during communications with the MA, the application in the MN 510 may issue interests with the prefix /RP-3/PoA-2/CN/X, indicating the fact that the interests have to be routed through the CN's 520 RP and PoA (PoA-3). When the MA receives the interests, the MA may further modify the prefix to forward the interest through the MA's own RP. The new prefix issued by the MA may be /RP-2/RA/RP-3/PoA-2/CN/X. When the MN's 510 RP receives this interest, the MN 510 may issue out a new interest, e.g., the interest originally issued by the MN's 510 application. The new interest prefix may be /RP-3//RA/PoA-2/CN/X. This may cause the interest to be routed through the CN's 520 RP. When the RP of the CN 520 receives the interest, the RP may issue a new interest with the prefix /PoA-2/CN/X, which may be sent to the appropriate application in CN 520. The CN's 520 application may generate a data response, which may re-trace the interest path to the MN 510. The prefixes may be constructed using the same logic from the CN 520 to the MN 510. The result of this operation is that the MN/CN's RP may be aware of both the interests being issued by the node its servicing and also the remote peer.

During mobility, e.g., when the CN 520 moves from its current PoA to another PoA, the MA may notify its current RP about the CN's 520 move. This may cause the RP to take actions to ensure that the outstanding interests do not expire and the incoming data responses are not sent out but instead cached locally. For example, the interests being sent out from the MN 510 may be cached at RP-2. When the CN 520 re-homes to a new PoA (PoA-3) and the PA informs the RP about the CN's 520 new location, the RA may issue out new interests indicating the MN's 510 new location. For the outstanding interests from the MN 510 to the CN 520, the data responses may be forwarded to RP-3 (as it hasn't changed yet), which may then remap the data responses to the correct prefix and send the data responses out to RP-2 for further forwarding. The RP-3 may be a temporary home agent, e.g., until the MA or the application in MN 510 is updated about the CN's 520 new location. The update to the MN 510 may be triggered using the procedures above. If the RP changes, then this change may be updated at the controller and informed to the MN 510, so that the interest prefix reflect the new RP.

Figure 6:
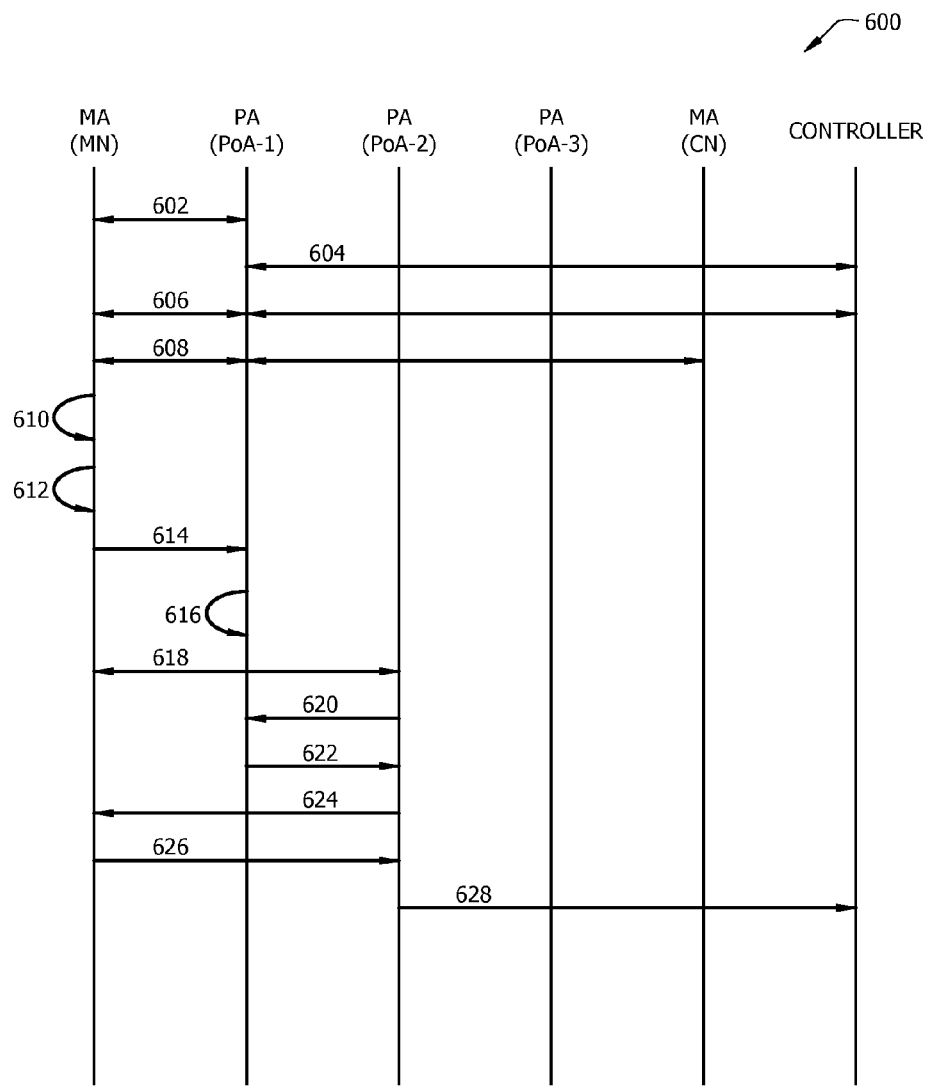
FIG. 6 is a protocol diagram of an embodiment of a PoA based seamless mobility method.

FIG. 6 illustrates an embodiment of a PoA based seamless mobility method 600, which may be implemented in the PoA based seamless mobility scheme 300. This scheme may correspond to a content-access scenario where content may be static and may be accessed by a mobile MN. The method 600 may be implemented by at least some of the components of the CCN/NDN, including a MN, a CN that may communicate with the MN, and the PoAs (e.g., BSs or access gateways) associated with the MN and CN.

At step 602, the MA in the MN may register with a first PoA (PoA-1) that the MN attaches to using the MN's ID. A successful registration may create a bi-directional forwarding path between the MA and the PA of the PoA, which may be used to support seamless mobility. The successful registration may also create an entry in the form /MN-ID/MA in the PA, which may allow the PA to forward any incoming interests from the network and other control messages to the MA in MN. Similarly, the MA may be assigned a prefix by the PA (e.g. /PoA-1/PA/MN-ID), which may enable the MA to forward application interests to the PA.

At step 604, after the registration, the PA may update a controller of the network about MN's current location, for example at a FIB of a centralized network component. At step 606, to establish a conversation with a CN, the MN may first resolve the location of the CN through the PA, which may resolve the CN's location though the controller. At step 608, during the MN's conversation, the interest X may be pre-appended with the prefix for the PA and the anchoring point of the CN. The interest may pre-appended with the prefix for the PA by the MA and may be then pre-appended with the prefix for the CN by the PA. For example, the prefix may be /PoA-1/PA/MN-ID/PoA-3/CN-ID/X, where PoA-1 is the PoA attached to the MN, and PoA-3 is another PoA attached to the CN. The interest path may be segmented to a section from the MN to the PoA, a second section from the PoA of the MN to the PoA of the CN, and a third section from the PoA to the CN. This may enable the PoA to keep track of the interests (and data responses) that are pending on behalf of the MN (and the CN).

At step 610, the MA may receive a handoff trigger from the MAC layer (as the MN initiates a handoff to move to a new PoA, PoA-2). At step 612, the MA's forwarding agent may then stop issuing any future interests. At step 614, the MN may send a de-registration message to the PoA. At step 616, the PA may refresh the interests of the MN with a longer expiry time. The data responses in the cache may also be set to longer expiry time. At step 618, to register with a new PoA that the MN attaches to, the MA in the MN may establish a forwarding path with the PA of the new PoA. The MA may also provide information to the new PoA on the previous PoA.

At step 620, to retrieve data from the old PoA, the PA in the new PoA may express interests to the PA of the old PoA to retrieve the MN's cached data. At step 622, the previous PA may respond with the pending interests for which the previous PoA has received data responses. The previous PA may also send any received and cached data responses to the new PA. At step 624, the PA in the new PoA may express pending interests from the old PA to the MN. The new PA may return any received data responses from the old PoA to the MN. At step 626, the MN may start re-expressing pending interests after registering with the new PoA. The pending interests may be marked so that the new PA may identify the interests as expressed from the old PoA. At step 628, the controller may be updated, e.g., by the new PA, about MN's new location.

Figure 7:
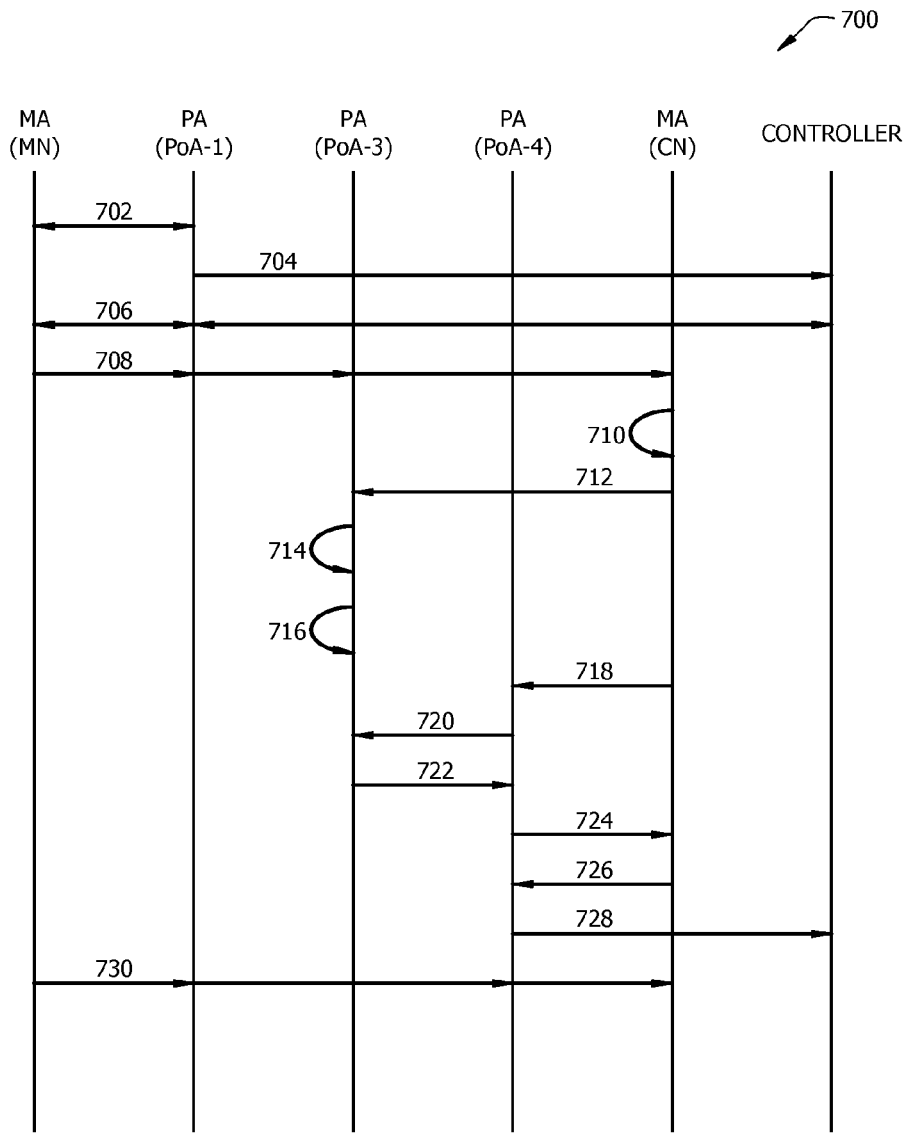
FIG. 7 is a protocol diagram of another embodiment of a PoA based seamless mobility method.

FIG. 7 illustrates another embodiment of a PoA based seamless mobility method 700, which may be implemented in the PoA based seamless mobility scheme 400. This scheme may correspond to a host-to-host mobility scenario where the MN may be static and the content may be mobile. The method 700 may be implemented by at least some of the components of the CCN/NDN, including a MN, a CN that may communicate with the MN, and the PoAs (e.g., BSs or access gateways) associated with the MN and CN.

The steps 702 to 708 may be first implemented similar to the steps 602 to 608 described above, respectively. At step 710, the MA of the CN may stop issuing out any new data responses (for the MN) and may cache the data responses. At step 712, the MA in the CN may notify its PoA about its handoff trigger. At step 714, the PA of the PoA may stop forwarding future interests (from the MN) destined to the CN. Additionally, the existing pending interests (at the PoA) may be refreshed for longer expiry time. At step 716, the PA may cache any interests that may still be forwarded from the MN during the CN's handoff procedure and mobility.

At step 718, the CN may register with a new PoA, PoA-4. At step 720, the new PoA may express interests to the old PoA for the pending interests, which may require data responses from the CN. At step 722, the old PoA of the CN may start expressing and forwarding the pending interests to the new PoA. At step 724, the new PoA may identify the received interests from the old PoA and forward the interest to the CN. At step 726, the CN may respond to the received interests with cached data responses or forward the received interests to the application (of the CN) for obtaining the data responses. At step 728, the PA of the new PoA may update the controller and trigger an update to the MN. At step 730, the MN may resolve the new location of the CN, and hence the interests may be forwarded correctly from the MN to the CN through the network.

Figure 8:
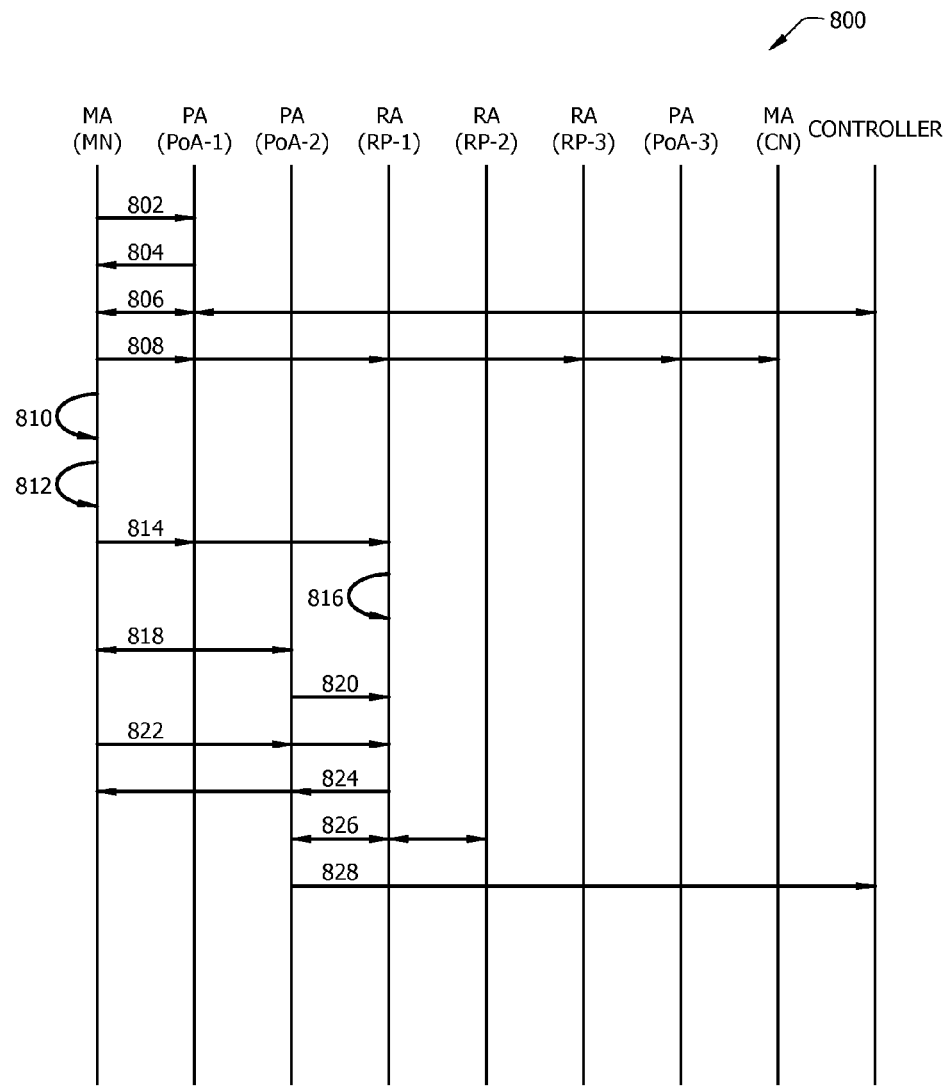
FIG. 8 is a protocol diagram of an embodiment of a RP based seamless mobility method.

FIG. 8 illustrates an embodiment of a RP based seamless mobility method 800, which may be implemented in the RP based seamless mobility scheme 500. This scheme may correspond to a content-access scenario where content may be static and may be accessed by a mobile MN. The method 800 may be implemented by at least some of the components of the CCN/NDN, including a MN, a CN that may communicate with the MN, the PoAs (e.g., BSs or access gateways) associated with the MN and CN, and the RPs associated with the PoAs.

At step 802, the MA in the MN may register with a first PoA that the MN attaches to using the MN's ID. The PA at the PoA may be a relay agent of control messages and assigning a RP for the MN. At step 804, when the MN completes registration, the PoA may notify the MN of the prefix to use to forward interests to the RP, e.g. /RP/RA. At block 806, the MN may resolve the location of the CN through the PA and the controller. At step 808, the interest X may be modified to a part for RP routing information and another part for information to route to CN's RP. For example, the interest X may be modified to /RP-1/RA/RP-3/PoA-3/CN-ID/X, where RP-1 may be associated with the PoA of the MN, and RP-3 with PoA-3 may be associated with the CN. The interest path may be segmented into a first part from MN to RP-1, a second part from RP-1 to RP-2, and a third part from RP-2 to CN.

At step 810, the MA may receive a handoff trigger from the MAC layer. At step 812, the MA's forwarding agent may stop issuing any future interests. At step 814, the MA may send a de-registration message to the PA, which may relay it to the RA (at the RP of the MN). At step 816, the RA may refresh the pending interests with longer expiry period and may cache the data responses for MN. At step 818, the MN may register with a new PoA, and may notify the new PoA about the RP (of the old PoA) that may be currently servicing the MN. At step 820, the PA in the new PoA may communicate with the RP to notify the RP about the new location of the MN. The new PoA may allow the MN to use the current RP until the MN may complete the handoff phase.

At step 822, after registering with the new PoA, the MN may start re-expressing the pending interests. The pending interests may be forwarded to the RP of the MN that currently has not changed. At step 824, the RP may fetch the cached data and respond back to the MN. The other (non-pending) interests may be forwarded in a typical manner (as is). The old RP may be at this point inefficient for forwarding interests from the new PoA's perspective. At step 826, the RP for the MN may be changed to a new RP by the new PA through inter-RP interaction (between the old and new RP) so that the forwarding state for the MN may be fully transferred to the new RP. At step 828, the PA of the new PoA may also update the controller about the change of RPs.

Figure 9:
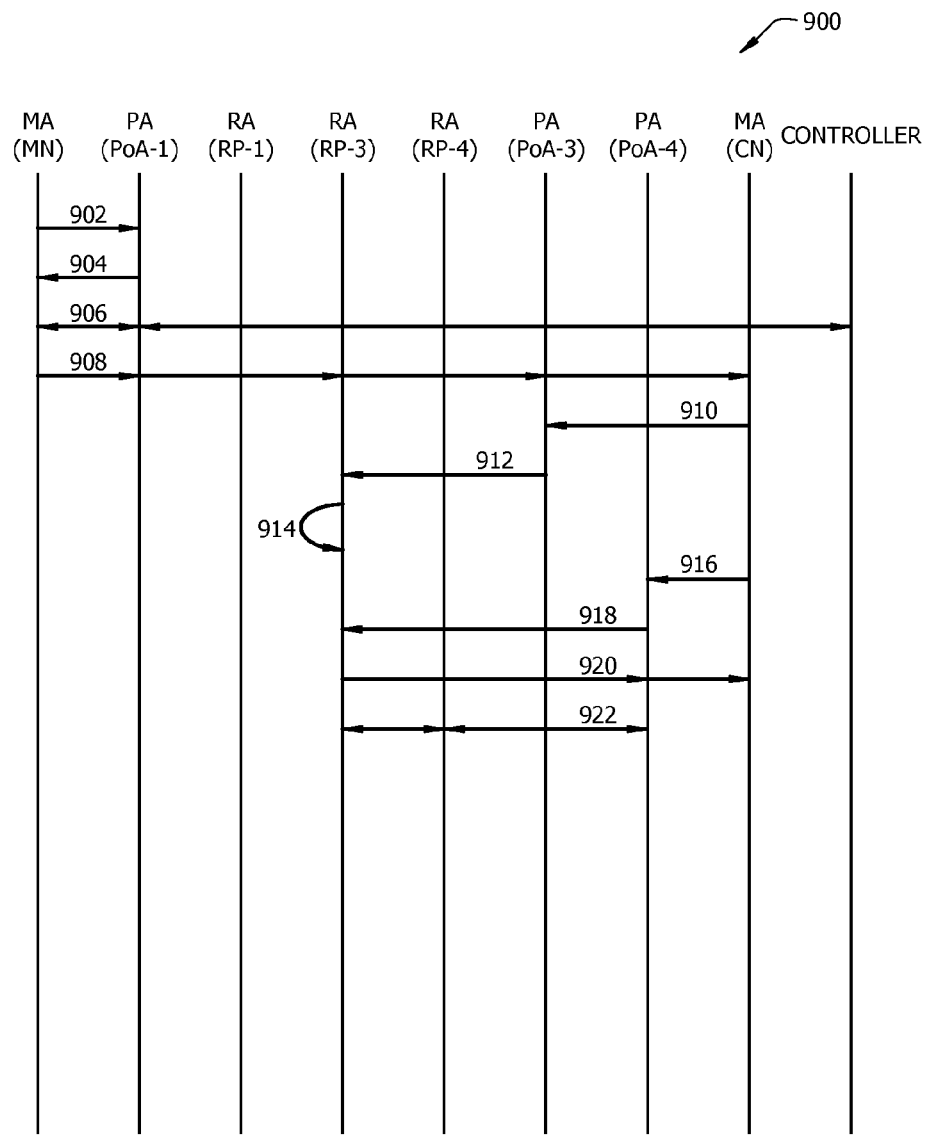
FIG. 9 is a protocol diagram of another embodiment of a RP based seamless mobility method.

FIG. 9 illustrates another embodiment of a RP based seamless mobility method 900, which may correspond to a host-to-host mobility scenario where the MN may be static and the content may be mobile. The method 900 may be implemented by at least some of the components of the CCN/NDN, including a MN, a CN that may communicate with the MN, the PoAs (e.g., BSs or access gateways) associated with the MN and CN, and the RPs associated with the PoAs.

The steps 902 to 908 may be first implemented similar to the steps 802 to 808 described above, respectively. At step 910, when the CN moves to a new PoA (PoA-4), the CN may notify its old PoA (PoA-3). At step 912, the PoA may trigger notification to the CN's RP (RP-3). At step 914, the RP may stop forwarding future interests from MN to the CN. At step 916, the CN may register with a new PoA. At step 918, the PA of the new PoA may notify the CN's RP about the CN's new location. At step 920, the RA may begin issuing new interests to the CN, which may result in data responses to the pending interests from the MN. At step 922, the PA may assign a new RP (RP-4) to the CN. An inter-RP interaction may be used to ensure smooth transition of the forwarding state.

Figure 10:
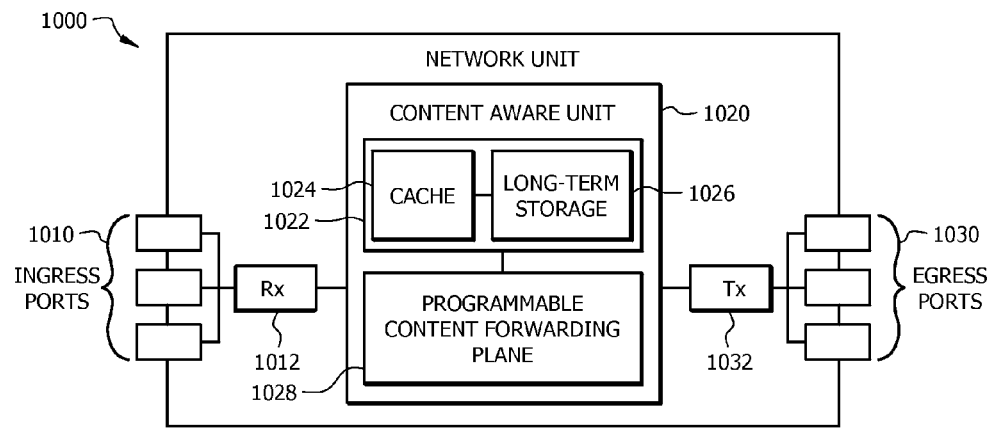
FIG. 10 is a schematic diagram of an embodiment of a network unit.

FIG. 10 illustrates an embodiment of a network unit 1000, which may be any device that transports and processes data through a network. For instance, the network unit 1000 may correspond to or may be located in any of the system nodes described above, such as a MN, CN, BS, access gateway, or content router. The network unit 1000 may also be configured to implement or support the schemes and methods described above. The network unit 1000 may comprise one or more ingress ports or units 1010 coupled to a receiver (Rx) 1012 for receiving signals and frames/data from other network components. The network unit 1000 may comprise a content aware unit 1020 to determine which network components to send content to. The content aware unit 1020 may be implemented using hardware, software, or both. The network unit 1000 may also comprise one or more egress ports or units 1030 coupled to a transmitter (Tx) 1032 for transmitting signals and frames/data to the other network components. The receiver 1012, content aware unit 1020, and transmitter 1032 may also be configured to implement at least some of the disclosed schemes and methods above, which may be based on hardware, software, or both. The components of the network unit 1000 may be arranged as shown in FIG. 10.

The content aware unit 1020 may also comprise a programmable content forwarding plane block 1028 and one or more storage blocks 1022 that may be coupled to the programmable content forwarding plane block 1028. The programmable content forwarding plane block 1028 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, and FIB) at the content aware unit 1020 or the network unit 1000. The programmable content forwarding plane block 1028 may interpret user requests for content and accordingly fetch content, e.g., based on meta-data and/or content name (prefix), from the network or other content routers and may store the content, e.g., temporarily, in the storage blocks 1022. The programmable content forwarding plane block 1028 may then forward the cached content to the user. The programmable content forwarding plane block 1028 may be implemented using software, hardware, or both and may operate above the IP layer or L2.

The storage blocks 1022 may comprise a cache 1024 for temporarily storing content, such as content that is requested by a subscriber. Additionally, the storage blocks 1022 may comprise a long-term storage 1026 for storing content relatively longer, such as content submitted by a publisher. For instance, the cache 1024 and the long-term storage 1026 may include Dynamic random-access memories (DRAMs), solid-state drives (SSDs), hard disks, or combinations thereof.

Figure 11:
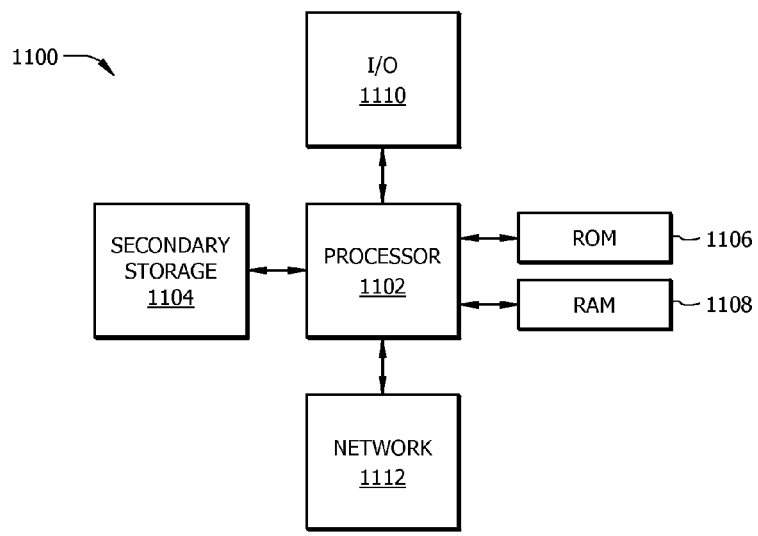
FIG. 11 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 11 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_1+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A networking system for a content-centric-network (CCN)/named-data networking (NDN) comprising:
    a first point of attachment (PoA) configured to:
       communicate with a corresponding node (CN) in a communications session with a mobile node (MN);
       receive interest packets from the MN for content stored at the CN, the interest packets comprising prefixes indicating path segments between the MN and the CN via the first PoA;
       maintain a forwarding state for the CN, wherein the forwarding state indicates pending interests for content based on the prefixes from the received interest packets;
       cache the pending interests upon receiving control information indicating a handoff for the CN; and
       forward the cached pending interests toward the CN via a second PoA by updating the prefixes to indicate the second PoA upon receiving an indication that the CN is attached to the second PoA.

2. The networking system of claim 1, wherein the first PoA communicates with the MN at a NDN protocol layer.

3. The networking system of claim 1, wherein the first PoA is a base station for a cellular network.

4. The networking system of claim 1, wherein the first PoA is further configured to:
    receive data responses to the pending interests from the CN; and
    forward the data responses to the MN,
    wherein the interest packets and data responses are forwarded between the MN and the CN via the first PoA before the handoff and via the second PoA after the handoff based on modification of associated prefixes.

5. The networking system of claim 1, wherein the interest packets and data responses are exchanged via the first PoA and the second PoA for applications that have higher user quality of experience (QoE) requirements, and wherein the interest packets and data responses for other applications that have lower user QoE requirements are exchanged using default network forwarding and re-expression of the pending interests when the CN is mobile.

6. The networking system of claim 1, wherein the first PoA comprises a first proxy agent (PA) configured to communicate with a mobility agent (MA) at the CN and a second PA at the second PoA, wherein the control information indicating the handoff is received from a mobility control agent at the MA, and wherein the interest packets and the data responses are exchanged with a mobility forwarding agent at the MA.

7. The networking system of claim 6, wherein the first PoA communicates with the mobility forwarding agent to support communications with a NDN protocol layer based on Physical (PHY)/Media Access Control (MAC) connectivity layer communications for communicating events indicating various stages of the handoff for the CN.

8. The networking system of claim 7, wherein the first PoA further communicates with the mobility forwarding agent to support communicating the interest packets and the data responses to an application operating on the CN via the NDN protocol layer.

9. The networking system of claim 1, wherein the first PoA is further configured to refresh at least some of the pending interests upon receiving control information indicating the handoff for the CN, wherein the pending interests are refreshed to prevent interest expiration during an estimated handoff duration associated with the handoff.

10. A networking system for a content-centric-network (CCN)/named-data networking (NDN) comprising:
a first rendezvous point (RP) node coupled to the CCN/NDN and configured to:
communicate with a mobile node (MN) via a first point of attachment (PoA);
receive interest packets from the MN for content stored at a corresponding node (CN), the interest packets comprising prefixes indicating path segments between the MN and the CN via the first PoA;
maintain forwarding state information for the MN, the forwarding state information indicating pending interests for content based on the prefixes from the received interest packets;
cache responses to the pending interests upon receiving control information indicating a handoff for the MN; and
forward the cached responses to the pending interests toward the MN via a second PoA by updating forwarding state information prefixes to indicate the second PoA upon receiving information indicating that the MN is attached to the second PoA.

11. The networking system of claim 10, wherein the first RP node is further configured to communicate with a network controller to support mapping a location of the MN to the first RP and to a current PoA associated with the MN.

12. The networking system of claim 11, wherein the MN's location is mapped to the first RP node and the current PoA in a Forward Information Base (FIB) by employing an MN identifier (ID).

13. The networking system of claim 10, wherein the first RP node is further configured to:
forward interests to the CN via a second RP node and a third PoA based on the prefixes from the received interest packets; and
receive responses from the CN via the second RP node and the third POA,
wherein the pending interests are interests sent toward the CN for which no corresponding response has been received at a specified time.

14. The networking system of claim 10, wherein the cached responses are forwarded to the second PoA and the MN via a third RP node, and wherein the information indicating that the MN is attached to the second PoA is received from the third RP node.

15. The networking system of claim 14, wherein the third RP node is selected from a plurality of content routers or access gateways by the second PoA after the handoff.

16. The networking system of claim 14, wherein at least some of the first RP node, the second RP node, and the third RP node are selected from a plurality of content routers or access gateways using a plurality of global network objectives to minimize delays and losses in the interests and responses between the MN and the CN.

17. The networking system of claim 14, wherein at least some of the first RP node, the second RP node, and the third RP node are selected from a plurality of content routers or access gateways using a plurality of local optimization objectives including geographical locations of the first PoA, the second PoA, and the third PoA.

18. The networking system of claim 10, wherein the first RP node is further configured to refresh at least some of the pending interests upon receiving control information indicating the handoff for the MN, wherein the pending interests are refreshed to prevent interest expiration during an estimated handoff duration associated with the handoff.

19. A network node of a content-centric-network (CCN)/named-data networking (NDN) network, the network node comprising:
a proxy agent (PA) configured to communicate with a mobility agent (MA) at a mobile node (MN), the PA comprising:
a proxy control agent configured to manage the MN, storing a forwarding state for the MN, and implement a logic to enable mobility for the MN within the CCN/NDN, and
a proxy forwarding agent configured to participate in processing of a plurality of interests and data responses exchanged between the MN and the CCN/NDN,
wherein the forwarding state indicates pending interests for which no corresponding data response has been received prior to a handoff;
wherein the PA is further configured to:
receive interests from the MN for content stored at a corresponding node (CN), the interests comprising prefixes indicating path segments between the MN and the CN via the PA;
store the prefixes with the pending interests in the forwarding state;
cache data responses to the pending interests upon receiving control information indicating a handoff for the MN; and
forward the cached data responses to the pending interests toward the MN via a first PoA by:
updating the prefixes in the forwarding state to indicate the first PoA upon receiving control information indicating that the MN is attached to the first PoA; and
including the updated prefixes in the cached data responses prior to forwarding.

20. The network node of claim 19, wherein the proxy control agent comprises a client management component for managing the MN and keeping track of the forwarding state of the MN, and a client interest/data management component for implementing the logic to enable seamless mobility for the MN.

21. The network node of claim 19, wherein the PA is further configured to communicate with a NDN protocol layer that communicates with a Physical (PHY)/Media Access Control (MAC) connectivity layer for forwarding the interests and the data responses.

22. The network node of claim 19, wherein the network node that comprises the PA is a base station (BS) or an access gateway coupled to the CCN/NDN and the MN, and wherein the network node comprises a second PoA configured to maintain the forwarding state for the MN at a NDN protocol layer prior to the handoff.

23. The network node of claim 19, wherein the network node that comprises the PA is a content router or an access gateway coupled to the CCN/NDN and to the MN via a second PoA, and wherein the PA is further configured to serve as a rendezvous point (RP) by maintaining the forwarding state for the MN at a NDN protocol layer.

24. The network component of claim 19, wherein the PA is further configured to refresh at least some of the pending interests upon receiving control information indicating the handoff for the MN, wherein the pending interests are refreshed to prevent interest expiration during an estimated handoff duration associated with the handoff.

25. A method implemented by a network node for a content-centric-network (CCN)/named-data networking (NDN), comprising:

exchanging interests and data responses between a corresponding node (CN) and a mobile node (MN) during a communications session, wherein the interests comprise prefixes indicating path segments between the MN and the CN via a first point of attachment (PoA);

maintaining a forwarding state for the session, wherein the forwarding state indicates pending interests for unreceived data responses and prefixes associated with the pending interests;

receiving, using a receiver, a message comprising control information indicating the CN has initiated a handoff from the first PoA;

caching, in a local cache, pending interests received from the MN during the handoff of the CN;

receiving, via the receiver, an indication from a second PoA for the CCN/NDN, the indication requesting the network node forward the pending interests in the cache to the CN via the second PoA;

updating the prefixes associated with the pending interests in the forwarding state to indicate the second PoA; and forwarding, using a transmitter, the pending interests to the CN via the second PoA based on the updated prefixes.

26. The method of claim 25, further comprising updating a controller of the NDN/CCN with information indicating a location of the CN in association with the network node upon handoff.

27. The method of claim 25, further comprising refreshing, in the local cache, at least some of the pending interests for longer expiry time upon receiving the control information indicating the CN handoff, wherein refreshing is performed to prevent interest expiration during an estimated handoff duration associated with the handoff.

28. The method of claim 25, wherein the network node is a base station (BS) or an access gateway coupled to the CCN/NDN and the CN and that serves as the first PoA configured to maintain the forwarding state for the CN at a NDN protocol layer.

29. The method of claim 25, wherein the network node is a content router or an access gateway coupled to the CCN/NDN and to the CN via the first PoA, the network node serving as a rendezvous point (RP) configured to maintain the forwarding state for the CN at a NDN protocol layer.

30. The method of claim 25 further comprising:
creating a bi-directional forwarding path for the session;
creating an entry for the session to forward any interests and data responses for the session; and
assigning at least one of the prefixes to the CN, the at least one prefix indicating the network node and a CN identifier (ID).

31. The method of claim 25 further comprising receiving an interest from the MN that includes a prefix indicating the network node and a MN identifier (ID), wherein updating the prefixes comprises appending to the prefix a CN ID and an ID for the second PoA.

* * * * *